(12) United States Patent
Serra et al.

(10) Patent No.: US 6,698,510 B2
(45) Date of Patent: Mar. 2, 2004

(54) ARTICLE AND METHOD FOR TEMPERATURE REGULATION USING A THERMOSENSITIVE REACTIVE HYDROGEL MATERIAL

(75) Inventors: Marco Serra, Arlington, MA (US); Lev Bromberg, Swampscott, MA (US); Jaco van Reenen Pretorius, Cambridge, MA (US); Brett P. Masters, Belmont, MA (US)

(73) Assignee: Mide Technology Corporation, Medford, MA (US)

( * ) Notice: Subject to any disclaimer, the term of this patent is extended or adjusted under 35 U.S.C. 154(b) by 0 days.

(21) Appl. No.: 09/840,836

(22) Filed: Apr. 24, 2001

(65) Prior Publication Data

US 2003/0010486 A1 Jan. 16, 2003

(51) Int. Cl.$^7$ ................................. F28F 7/00

(52) U.S. Cl. .............. 165/185; 165/907; 165/902; 165/46; 165/10; 165/10 A; 2/2; 2/2.15

(58) Field of Search .................. 165/10, 10 A, 165/46, 80.4, 902, 907, 185; 2/2, 2.15

(56) References Cited

U.S. PATENT DOCUMENTS

| | | |
|---|---|---|
| 3,367,319 A | 2/1968 | Carter |
| 3,391,686 A | 7/1968 | Wiswell |
| 3,402,708 A | 9/1968 | Grega |

(List continued on next page.)

OTHER PUBLICATIONS

*Gels*, Toyoichi Tanaka; reprinted by UMASS Medical Library from Scientific American, Jan., 1981 p. 124–138.

*Thermal Protection Performance of Survival Suits in Ice–Water*, J. S. Hayward, B. Sc., Ph. D.; Aerospace Medical Association, Washington, D.C. reprinted from Aviation, Space, and Environmental Medicine, Mar., 1984.

*Volume–phase Transitions of Ionized N–Isopropylacrylamide Gels*, Hirotsu, et al., J. Chem. Phys. 87 (2) Jul. 15, 1987.

*Heat Exchanges in Wet Suits*, Wolff, et al.; The American Psysiological Society, pp. 770–777, 1985.

*Handbook of Porous Media*, ed. Kambiz Vafai, 2000.

*Micro–Electro–Mechanics of Ionic Polymeric Gels As Electrically Controllable Artificial Muscles*, Mohsen Shahinpoor; Journal of Intelligent Material Systems and Structures, vol. 6–May, 1995.

*The Effect of Leakage on the Insulation Provided by Immersion–Protection Clothing*, Allan, et al. Aviation, Space, and Environmental Medicine, Nov., 1985.

*Primary Examiner*—Henry Bennett
*Assistant Examiner*—Nihir Patel
(74) *Attorney, Agent, or Firm*—George W. Neuner; Steven M. Jensen; Edwards & Angell, LLP

(57) ABSTRACT

A temperature regulation and flow control device is described. A web of material, e.g., for a wet suit, has a layer of gel particles embedded in a flow control layer, preferably a foam matrix. A water permeable neoprene layer covers the flow control layer and allows water to enter the suit. The flow of water in the suit is regulated by the expansion and contraction of the gel as it undergoes a volume phase transition in response to a change in temperature. When the diver is in cold water, the cold water enters the foam substrate and the gel expands, causing permeability (i.e., flow) to decrease. Flow is restricted in response to cooling, and the foam substrate expands and tightens the fit of the wet suit. In warmer water, an opposite effect occurs, whereby the gel contracts and flow increases. The gel contracts relaxing the fit of the suit. A gel having a particular volume phase transition critical temperature is selected in order to maintain body temperature in a particular environment. This technology also can be used to control temperature in other applications.

23 Claims, 12 Drawing Sheets

U.S. PATENT DOCUMENTS

| | | |
|---|---|---|
| 3,430,688 A | 3/1969 | Crocker |
| 3,450,127 A | 6/1969 | Harwood |
| 3,513,824 A | 5/1970 | Fitzgerald |
| 3,536,059 A | 10/1970 | Hearst et al. |
| 3,566,205 A | 2/1971 | Walker et al. |
| 3,572,314 A | 3/1971 | Teague |
| 3,583,386 A | 6/1971 | Slack |
| 3,660,849 A * | 5/1972 | Jonnes et al. .................. 2/2.1 |
| 3,884,216 A | 5/1975 | McCartney |
| 4,167,932 A | 9/1979 | Zebuhr |
| 4,294,225 A | 10/1981 | Mayo |
| 4,530,905 A | 7/1985 | Freedman |
| 4,569,861 A | 2/1986 | Smith et al. |
| 4,718,899 A | 1/1988 | Itoh et al. |
| 4,880,858 A * | 11/1989 | Farrar et al. .................. 524/60 |
| 5,277,915 A * | 1/1994 | Provonchee et al. ........ 424/485 |
| 5,447,689 A | 9/1995 | Gibboni et al. |
| 5,722,482 A * | 3/1998 | Buckley .................... 165/10 |
| 5,723,145 A * | 3/1998 | Shikinami et al. .......... 424/448 |
| 5,929,214 A * | 7/1999 | Peters et al. ................ 530/417 |
| 5,955,188 A * | 9/1999 | Pushaw .................. 428/320.2 |
| 5,960,469 A * | 10/1999 | Nuckols et al. ................ 2/2.1 |
| 6,025,287 A | 2/2000 | Hermann |
| 6,030,442 A * | 2/2000 | Kabra et al. ............. 106/162.8 |
| 6,032,409 A * | 3/2000 | Obonai et al. ................ 47/44 |
| 6,130,304 A * | 10/2000 | Sumiya et al. ........... 526/317.1 |
| 2002/0023283 A1 * | 2/2002 | Kania et al. .................. 2/2.15 |

* cited by examiner

ARTICLE AND METHOD FOR TEMPERATURE REGULATION USING A THERMOSENSITIVE REACTIVE HYDROGEL MATERIAL

STATEMENT REGARDING FEDERALLY SPONSORED RESEARCH

This invention was made with U.S. Government support under Contract Nos. USZA22-99-P-0039 and USZA22-00-C-0008, monitored by the U.S. Special Operations Command. The Government has certain rights in the invention.

FIELD OF INVENTION

The present invention relates to the field of temperature regulation devices and, more particularly, to a material containing gel particles that is useful for regulating fluid flow in response to changes in temperature such as the flow of water in a wet suit to control skin temperature of the wearer and to methods for regulating temperature using the same.

BACKGROUND OF THE INVENTION

Exposure suits can be classified into two general categories, wet and dry. Traditional wet suits are usually manufactured of porous neoprene. They allow water to impregnate the suit material, trapping a thin layer of water between the fabric of the suit and the wearer's skin, which is warmed by body heat. Essentially, wet suits rely on limiting the amount of water exchange between the inner surface of the suit and the environment to keep the wearer warm and, for this reason, suit fit is of critical importance. Generally, the degree of protection against the outside environment increases with fabric thickness. Although wet suits are efficient in protection against cold water, they are constricting because they have a tight fit and tend to inhibit free movement due to their thickness. Small punctures will not have a major impact on the functionality of the suit.

Dry suits, on the other hand, are manufactured of impermeable materials, normally have latex rubber seals at the extremities, and are filled with air. The trapped air provides an insulating effect in the suit, but thermal underwear must also be worn for protection against the cold. Although these suits allow ease of movement, they are not practical for swimming, because the buoyancy and displacement effects of the air hamper body control. If punctured, dry suits can take on significant amounts of water, rendering them useless in terms of insulation and dangerous in terms of flotation.

Survival and thermal exposure suits for ice water conditions tend to be of the dry suit type. These suits offer excellent protection by keeping the wearer dry and warm through a combination of the insulating properties of air and the use of underclothing. They are ideally suited to survival conditions because they provide a high level of buoyancy and the highest degree of thermal protection against cold conditions. They are, however, susceptible to leakage and punctures.

Once punctured and saturated with water, dry suits retain roughly 35% of their insulating capability. This asymptotic trend is attributed to the fact that once the suit is saturated, additional water simply fills the space between the suit and the body. At this point the only thermal protection is that offered by the waterlogged suit material. Based on the function of a wet suit, it can be argued that, should the dry suit not limit water exchange once punctured, the remaining insulation capability would drop further.

Tests have been conducted on individuals performing various activities in cold water while wearing wetsuits having different thicknesses. (See Wolff, A. H., Coleshaw, S. R. K., Newstead, C. G., Keatinge, W. R., 1985 "Heat Exchanges in Wet Suits," *Journal of Applied Physiology*, vol. 58, no. 3, pp 770–777). It was reported that the flow of water between the suit and the skin was responsible for a significant portion of the heat loss in the suit. Typically, up to 30% of the heat loss at rest and up to 60% during exercise was reported to be caused by the forced convection resulting from water being pumped between the skin and the suit.

Consequently, it was reported that, for good insulation, fabric thickness is not as important as the limiting of water exchange under the suit. Wolff et al., reported that the difference in protection offered by a 4 mm and a 7 mm fabric is not radically different once the flow of water is restricted.

Even minor movement drastically increases the flow of water under the suit. The flow at the torso was reported to be roughly double that at the limbs, which can be attributed to the higher degree of suit fit accuracy on the limbs. In all cases, the test subjects were able easily to regulate and stabilize their body temperature for a large range of environmental conditions by controlling the flow through their movement. In cases where they overheated, simple movements would allow them to cool down by increasing water flow.

Various attempts at controlling the temperature of a diver have been made in the prior art. U.S. Pat. Nos. 3,367,319; 3,391,686; 3,402,708; 3,402,709; 3,450,127; 3,566,205; 3,572,314; 3,583,386; 3,884,216; 4,167,932 and 4,294,225 all disclose devices and methods for supplying heated fluid to a diver's suit. Some of those methods rely on exothermic chemical reactions that result from the mixture of two substances. Others rely on the transfer of heat from combustion of fuel to water circulated within the diving suit. All of these devices require a power source, usually strapped to the back of the diver, which will function for a definite time before requiring replenishment. U.S. Pat. No. 3,430,688 discloses a garment that comprises a mesh of tubes in which a fluid is circulated to provide cooling to the wearer. U.S. Pat. No. 5,960,469 describes an undergarment to be used by divers with wet or dry suits. The undergarment has a number of bladders filled with an insulating fluid, which has very low thermal conductivity. Fluid from an external reservoir is pumped into the bladders to provide the desired level of insulation.

All of the aforementioned patents disclose attempts at regulating the temperature in garments for use in extreme environmental conditions, but none address the issue of how to control the temperature and flow of water due to pumping under the wet suit.

U.S. Pat. No. 5,722,482 to Buckley describes a fabric containing a material for use in the manufacture of wetsuits, where the material regulates skin temperature. This apparatus regulates heat transfer through the action of a phase change material, embedded in one or more layers of the fabric. The phase change material stores or provides latent heat energy through its transition between the solid and liquid states. The method seeks to control conductive heat transfer through the wetsuit fabric. Due to the nature of the phase change materials, the suit is effective only until the phase change of the available material is complete, after which the phase change material must be regenerated.

U.S. Pat. No. 5,277,915 to Provonchee et al. describes a gel-in-matrix composition containing a fractured hydrogel that was formed in a foam matrix. The gel is treated to form a network of fractured channels to create hydraulic permeability to allow aqueous media to flow freely through the gel-in-matrix for efficient, intimate contact of the gel with a liquid medium. There is no teaching or suggestion that liquid flow through the gel-in-matrix can be controlled by changes in temperature.

U.S. Pat. No. 5,447,689 discloses a method and apparatus for flow control that consists of sizing materials applied to a porous substrate, such as foam. These materials are able to hold a fluid for a discrete time and then release it, effectively delaying its flow, but they have no capability to regulate flow in response to prevailing environmental conditions such as, for example, a change in temperature.

The latent heat of phase change between liquid and gas has been widely used in the control of heat flux. That takes advantage of the substantially large amount of heat energy that can be stored as latent heat during phase changes. U.S. Pat. No. 5,955,188 to Pushaw discloses a foam substrate that is impregnated with a dispersion of microspheres having such a phase change material encapsulated therein and the method for producing it. The phase change disclosed in Pushaw is associated with latent heat energy for melting a solid material such as a paraffin and, thus, must be regenerated (solidified).

None of the prior art provides a method or a material for controlling fluid flow in a layer containing gel particles in response to changes in temperature.

SUMMARY OF THE INVENTION

The present invention provides a material useful for regulating the surface temperature of an object having its surface in contact with the material, wherein the material comprises a flow control layer containing gel particles and a protective layer. In a preferred embodiment, the flow control layer comprises layer comprises gel particles embedded in a foam substrate. The size of the particles is selected depending upon the response time desired for the gel to undergo a volume phase transition. Preferably, the gel particles have a particle size in the range of from about 1 $\mu$m to about 1000 $\mu$m. The material can be used to control the surface temperature of the object by the transfer of heat from the surface of the object to a fluid that can be absorbed by the gel particles. The gel forming the particles has a gel volume phase transition critical temperature that can be varied and that is determined by the application for which the material is used. Generally, the gel volume phase transition critical temperature ("VPTCT") is approximately the same as the temperature that is desired for the surface of the object. The VPTCT is characterized as the temperature at which a material (the gel) begins to exhibit an accelerated change in volume of greater than approximately 1% per degree C. in response to a change in temperature of the material. For highly ionized gels, this acceleration can be represented as a discontinuity on the volume-phase transition curve for the gel.

Certain polymers known in the art are characterized by an inverse solubility behavior in aqueous solution. In the case of poly(N-isopropylacrylamide) (PNIPAM) that behavior is attributed to the delicate balance between the hydrophilic properties of the amide groups and the hydrophobic character of the isopropyl moieties. When heated above a lower critical solution temperature (the VPTCT), at which the hydrophilic PNIPAM chains collapse, the hydrophobic groups are accommodated within the separated polymer-rich phase. In the case of PNIPAM gels, such polymer chain collapse leads to a volume phase transition at temperatures slightly exceeding the VPTCT. On the volume phase transition curve, the VPTCT is characterized by the region of large rate of volume change versus small temperature change. This rate can be so large that the curve may exhibit a discontinuity in the region of the VPTCT.

The present invention also provides a wet suit article made from the above material having an outer water-permeable layer and an inner flow control layer, preferably made of gel particles embedded in an open cell foam matrix. The gel particles for this application have a gel phase transition critical temperature that is approximately the temperature at which the surface temperature of the wearer is desired to be controlled, e.g., in the range of about 18° C. to about 23° C.

The invention provides a method for controlling the flow of fluid in the material comprising a layer of gel particles embedded in a flow control layer, preferably an open cell foam matrix, wherein the gel expands when the temperature decreases to inhibit the flow of fluid in the material and contracts when the temperature increases to facilitate flow of fluid, thereby controlling the temperature. When the temperature of the fluid surrounding the gel particles has a temperature below the VPTCT, the gel particles absorb the fluid causing the gel to expand, reducing the permeability of the foam and reducing the flow the flow of water in the layer. In a wet suit, the expansion of the gel particles also provides a tighter fit to keep the wearer warm. When the temperature of the fluid surrounding the gel particles has a temperature above the VPTCT, the gel particles contract and expel fluid from the gel/foam matrix, thereby increasing permeability and permitting increased flow of fluid through the layer. This provides increased convective heat loss. In a wet suit, the expansion of the gel particles also provides a looser fit of the suit. In accord with the present invention, the gel undergoes a substantial volume change as a result of small changes in the temperature.

A wet suit material in accord with a preferred embodiment of the invention includes a composite laminate, which has at least one layer of an open cell foam in which is embedded approximately 5% to 80% mass fraction of hydrogel powder particles having a VPTCT that is approximately the temperature desired for the skin temperature of the wearer. The reversible property of the hydrogel particles regulates the skin temperature of the wearer, as described herein. The process is driven by the action of the hydrogel particles which react to the environment temperature in the presence of water by swelling and shrinking. The mechanism is driven by the pumping of water through the suit that naturally results from the diver's movements and the skin temperature of the diver is controlled by the convective heat flux that results from flow of the water. Thus, the process is continuous, self-regulating and requires no external power source or recharging.

Preferably, a wet suit in accord with the present invention includes an outer protective layer, e.g., of neoprene, which covers the gel/foam layer. Such outer protective layer preferably also has insulating properties to inhibit heat conduction. The major factors influencing the thermal regulation ability of the suit are the cross-sectional area of the foam substrate, the permeability of the foam substrate, the VPTCT of the gel, and the response time of the gel (which is influenced by the particle size of the gel). The gel is tailored to undergo the volume phase transition at an optimal temperature for skin temperature regulation, shrinking above this temperature and swelling below it. This material provides a reactive, closed loop system that regulates the flow of water through the suit in submerged conditions by regulating the permeability of the foam substrate in response to environmental temperature through the volume change action of the gel that is due to the volume phase change in response to changes in temperature.

The operation of a wet suit made out of a material having the gel particle-containing layer in accord with the present invention is as follows. When a diver enters cold water, the cold water is absorbed into the suit and the flow control layer is flooded, cooling the gel. Consequently, the gel absorbs the water, thereby expanding to limit flow and tighten the fit of the suit. Because water is trapped in the gel, convective heat loss is effectively eliminated, minimizing the heat loss through pumping. Further, the neoprene also is a good insulator and, over time, in the absence of convection, the diver will begin to heat up. As the diver warms and the gel in the flow control layer is heated past its VPTCT, it will begin to shrink, thereby increasing permeability of the flow control layer. This results in increased fluid flow in the layer and resulting increased heat loss through convection, cooling the diver. Because the gel is formulated to have a VPTCT at a specific temperature, the process of heating and cooling will result in the average temperature of the flow control layer oscillating around the VPTCT, thereby maintaining the diver's skin temperature at approximately the VPTCT, which is selected at a comfortable level.

BRIEF DESCRIPTION OF THE DRAWINGS

FIG. 8A is a graph illustrating the change in skin temperature (x) when there is a sudden change in the environment temperature (◇). FIG. 8B is a graph illustrating the change in skin temperature (x) when the material is punctured and cold water enters between the material and the skin.

DETAILED DESCRIPTION OF THE INVENTION INCLUDING THE PREFERRED EMBODIMENT(S)

Figure 1:
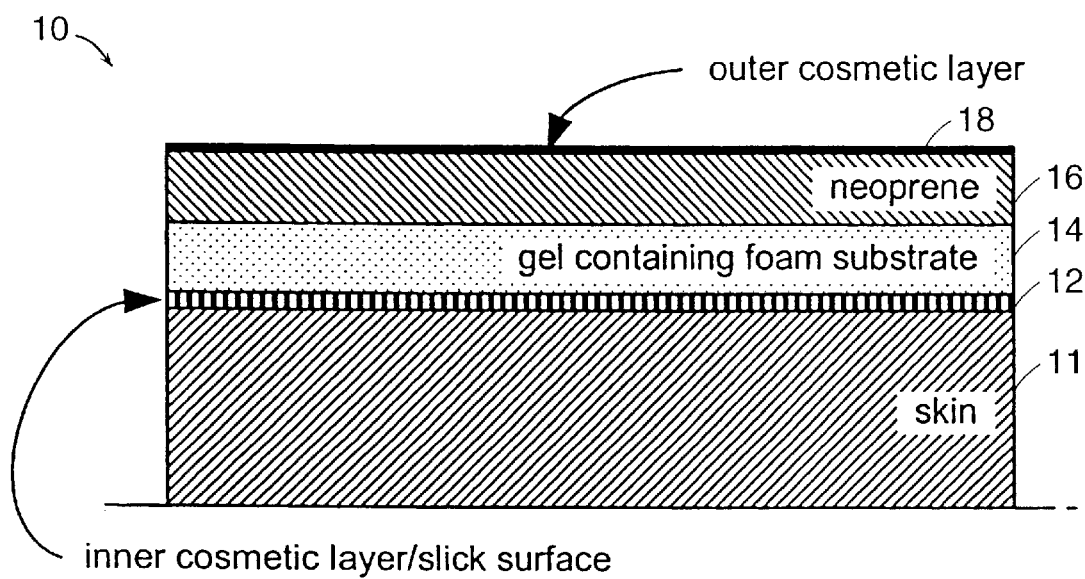
FIG. 1 is a cross-sectional view of the layers of a material in accord with a preferred embodiment of the present invention.

The present invention will be described in detail with reference to the drawings. As shown in FIG. 1, a material 10 in accord with the present invention is in intimate contact with the surface of an object or a body for which control of the surface temperature is desired, e.g., the skin of a diver. In this embodiment, the material 10 has an optional inner layer 12 selected for contact with the skin and ease of entering and removing the wet suit. Adjacent to the inner layer 12 is a flow control layer 14 containing gel particles. For example, the flow control layer 14 can comprise an open cell foam substrate with gel particles embedded therein. Next adjacent to the flow control layer 14 is an insulating/protecting outer layer 16, e.g., of neoprene. The outermost layer 18 is an optional cosmetic layer selected and designed, e.g., for appearance, fashion, etc.

The material 10 controls the temperature of an object (e.g., skin) 11 by regulating the flow of water between the neoprene layer 16 and the skin 11 through the volume-phase transition action of the gel particles contained in the flow control layer of the material 10 of the wet suit. The regulation of the fluid flow controls convective heat transfer, which is the major influence on temperature in this application. In a preferred embodiment, the material 10 consists of a layer of closed cell neoprene 16 and a flow control layer 14 of a hydrophilic open cell foam substrate containing between approximately 5% and 80% by weight of hydrogel particles based on the total dry weight of the foam substrate, a cosmetic layer 18 laminated to the outer face of the neoprene and a thin, permeable cosmetic layer 12 laminated to the exposed face of the foam substrate that is the interface between skin 11 and the suit material 10.

Figure 2A:
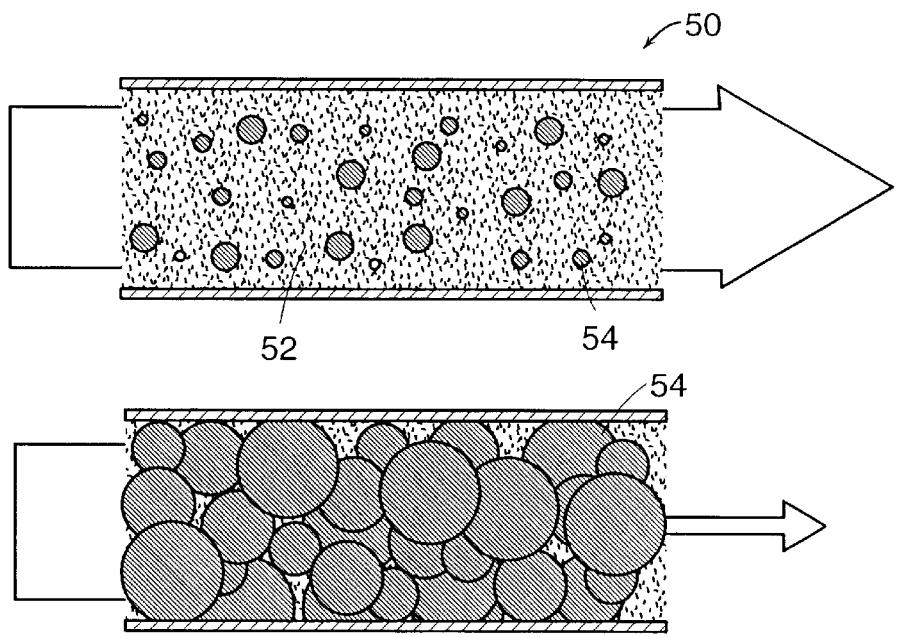
FIGS. 2A–2E are schematic depictions of various embodiments of the flow control layer of the present invention.

The process for embedding solid particles into a foam matrix is well known in the prior art. According to this process, gel particles can be embedded in a foam matrix to form a flow control layer. Typically, the gel particles are added to a foaming solution and the foam material formed into the desired shape such as a web of material. As shown in FIG. 2A, a foam layer 50 including a foam matrix 52 forms the flow control layer, wherein gel particles 54 are embedded in the foam matrix. The present invention uses a volume change response due to a volume phase transition property of the hydrogel particles in the foam layer by which the volume of the hydrogel particles changes in response to change in temperature and, as a result, causes the permeability of the foam layer to vary with temperature. Thus, the amount of water that can flow freely in the foam is regulated, effectively controlling the amount of convective heat transfer that takes place between the object (e.g., skin) and the environment (e.g., ocean).

Figure 2B:
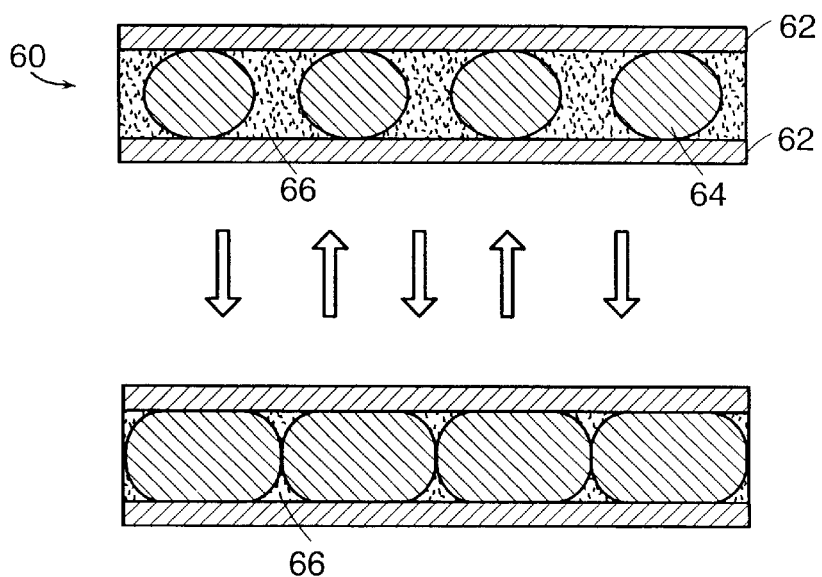

In another method of forming a flow control layer, as shown in FIG. 2B, gel particles 64 are chemically bonded to and contained between two layers 62 of permeable material, whereby the gel particles are fixed to the permeable material in a manner well known in the art. The resulting layered sheet exhibits a volume change response due to temperature similar to that exhibited by the aforementioned foam and gel matrix. The gel particles 64 can expand and contract within the flow area 66 in response to a change in temperature. Individual sheets can be stacked to form a flow control layer with multiple sub-layers Accordingly, this arrangement can be used in place of the foam and gel matrix previously described.

Figure 2C:
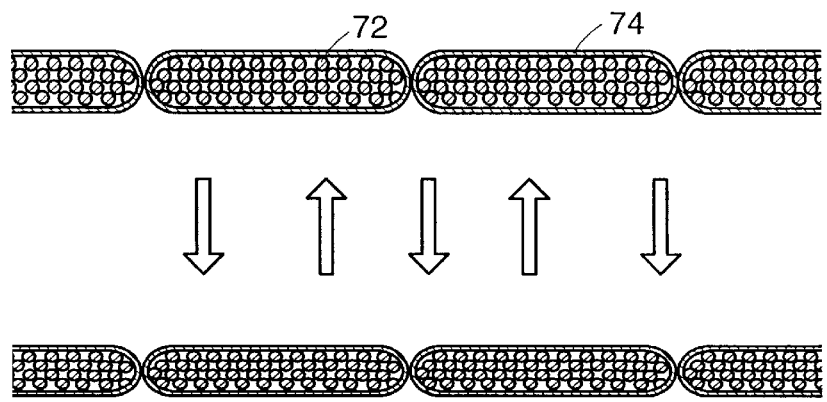

In another alternative method of forming the flow control layer, gel particles can be quilted into small pockets. As shown in FIG. 2C, according to this method, two layers of permeable fabric 74 are bonded together in a manner well known in the art, with gel particles 72 interspersed between the layers. The gel particles change their volume in response to changing temperature conditions in a manner similar to the foam and gel matrix. The quilted pockets can be formed in any desired orientation, e.g. in a manner such that flow channels do not occur in the flow direction. Multiple layers of the quilted fabric can be stacked.

Figure 2D:
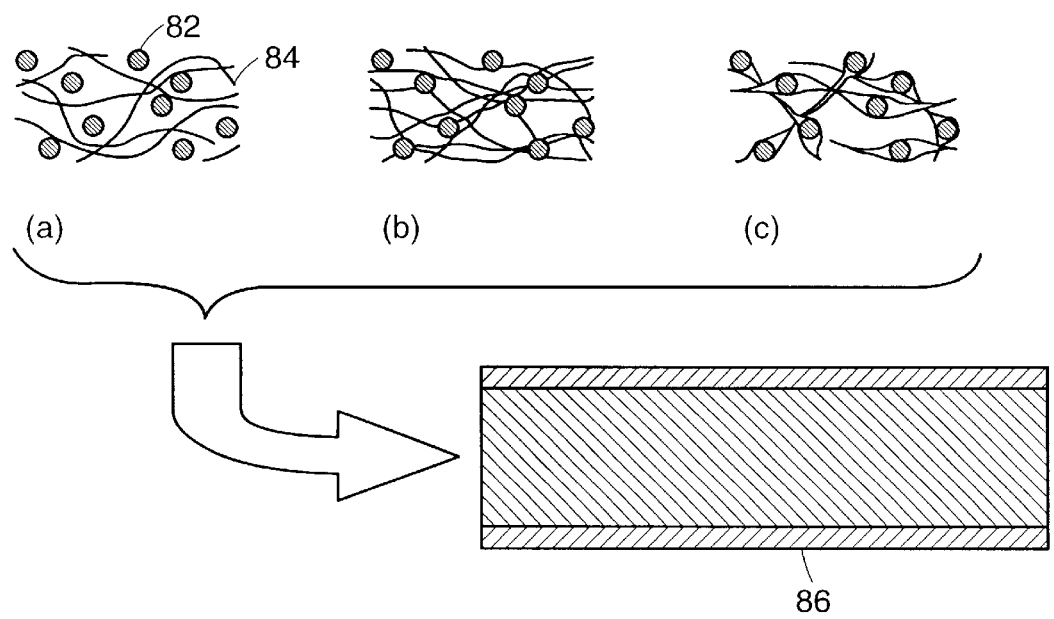

In a further method of forming the flow control layer, as depicted in FIG. 2D, gel particles 82 can be dispersed among fibers 84 or fibrous material and encased in a permeable membrane 86. The basic method of interspersing particles within the fibrous material and encasing the fibers in a membrane is well known in the art. According to the present method, the gel particles can be (a) freely dispersed among the fibers, (b) chemically bonded to the fibers, or (c) encased in the fibers. The fiber/gel material is encased in the permeable membrane 86 such that the gel can expand and contract within the fibers in response to changing temperature conditions.

Figure 2E:
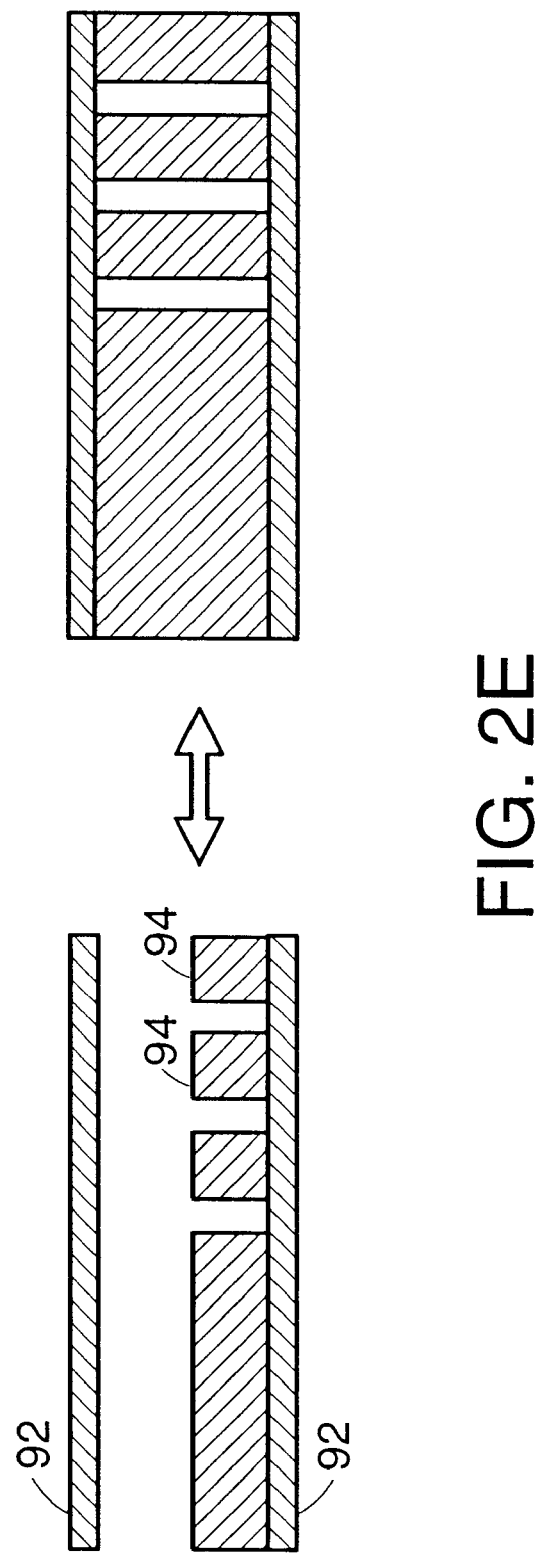

According to another method of forming the flow control layer, gel particles can be chemically bonded to fibers within a rigid or semi-rigid sheet of permeable material. This known method, as shown in FIG. 2E, involves inserting columns 94 or other formations of the fibers into an enclosed sheet 92 such that the gel particles can expand within a fixed or semi-fixed space in the sheet. Alternatively, the sheet can be replaced by multiple sheets which are bonded together to create a fixed or semi-fixed space in which the gel particles can expand. Although several preferred methods of forming a flow control layer have herein been described, it will be apparent to those having ordinary skill in the art that other methods can be substituted therefor, in order to create the desired flow control layer containing gel particles capable of changing volume in the layer.

Hydrogels typically consist of cross-linked, long chain polymer molecules immersed in a liquid medium, in this case water. The polymer chains in a gel prevent the water from escaping and the water prevents the polymer network from collapsing. This gives the gel properties somewhere between those of solids and liquids and, analogous to solids and liquids, the gels have the ability to change phase, in this case a gel volume phase transition. The gel volume phase transition is not associated with an absorption or release of latent heat of vaporization or latent heat of freezing. The volume phase transition undergone by the hydrogel is simply a substantial change in volume in response to a relatively small change in temperature, which can be illustrated by a discontinuity in the curve of volume versus temperature for a given gel system (including the polymer and the absorbed fluid).

Characteristics Of Gels

The gels used in the flow control layer 14 are three-dimensional, permanently cross-linked polymer networks. The gel polymers are chemically cross-linked, i.e., a multi-functional chemical reagent is added during synthesis that reacts with, and interconnects via covalent bonding, two or more polymer chains. The polymer networks, which can hold a fluid, are referred to as gels. Gels containing pores in the size range 0.01 to about 10 microns are micro porous. If some of the pores are interconnected, the gel is typically called an "open-cell" gel. If all the pores in the gel are interconnected to each other, the gel is a "bicontinuous" gel. If the pores are discrete (not connected to each other), so that the internal space of each pore is independent of the other pores, the gel is referred to as a "closed-cell" gel.

Gels are selected for use in accord with the present invention depending upon their VPTCT. The VPTCT of the gel preferably is substantially the same as the temperature at which it is desired to control the surface of the object, e.g., the skin temperature of the diver. Thus, the gel must be selected for the particular application.

Open cell gels are preferred in many applications because they can be "fast response" gels. A "fast response" gel is one that reaches 90% of its maximum volumetric phase transition change in a time that is at least ten times faster than a comparable closed cell gel of the same geometry when both gels are subjected to a similar change in environment conditions. When responsive gels are challenged with an environmental change (temperature, pH, ionic strength, light, electromagnetic field, etc.), such a change affects the gel by causing the gel to undergo a reversible volumetric change in which the gel volume expands or contracts substantially in response to a small change in the environment. Polymer gels can be expanded by (1) contacting a dried gel with a solvent and allowing the gel to non-reversibly swell with solvent or (2) initiating a reversible expansion of the gel to incorporate solvent by triggering the expansion with a stimulus, e.g., a change in an environment condition such as a change in temperature, pH, ionic strength, etc.

The degree of volumetric change between contracted and expanded states of the "responsive" gels at their particular environmental volume phase transition region is quantitatively much greater than the volume change of the gel outside the environmental volume phase transition region. Equations describing this volume behavior are not simple monotonic functions but contain a particular environmental condition where the volume change of the gel for a small change in a particular environmental component is very large causing a discontinuity in the graph of gel volume versus the environmental component. See, for example, "Gels" by T. Tanaka in *Scientific American* (January 1981), pp. 124–138.

The gel can be a single polymer network, which exhibits the desired volume phase transition at a suitable temperature for the desired application. Alternatively, the gel can be an interpenetrating polymer network (IPN) containing two or more polymer chains in which each polymer network maintains its properties. The properties of the IPN are a composite of the properties of the particular polymer networks forming the IPN.

The reversible volume change of the entire gel can be either continuous or discontinuous. A "continuous" volume change is marked by a reversible change in volume (i.e. a collapse or swelling) that occurs over a relatively large change in the environmental condition. Moreover, there exists a stable volume near the phase transition between the swollen and contracted volume states.

Gels useful in the present invention are those that may undergo a "discontinuous" volume change in which the reversible transition from swollen to collapsed state, and back again, occurs over an extremely small change in environmental condition, e.g., less than about 0.1° C., and occurs at a temperature suitable for use in a particular temperature control application where the VPTCT is desirably close to the temperature at which the surface of an object is to be controlled. Such reversible gels are often called "phase-transition" gels. For these gels, the VPTCT defines a region where there is no stable volume between the swollen and contracted volume states, i.e., the volume phase-transition, and the significant gel volume expansion and/or collapse occurs over an infinitesimally small temperature change. A gel undergoing a continuous phase-transition can have a similar order of magnitude total volume change as a gel undergoing a discontinuous phase-transition. However, it is the significant volume change in response to a small change in temperature that provides the useful application in accord with the present invention.

On a molecular level, the responsive gels are sensitive to small changes in certain environmental "trigger" conditions consisting primarily of temperature, pH, solvent concentration, and ion concentration. On a macroscopic level, any of a variety of environmental changes can be imposed on the gel, which allows the specific trigger to induce a volume change. These environmental conditions can be a change in temperature, electric field, photon energy, pH, solvent composition, ion concentration, concentration of biomolecules, pressure, etc.

The gels used in the present invention are provided as particles and combined with a foam substrate matrix. The particle size affects the response time of the gel. Thus, the particle size is selected for the application. In general, particle sizes in the range of from about 1 µm to about 1000 µm are useful in the practice of the present invention. Preferably, gel particles having a particle size in the range of from about 10 µm to about 500 µm are used, more preferably in the range of from about 100 µm to about 250 µm.

The volumetric changes of gels result from competition between intermolecular forces, usually electrostatic in nature, that act to expand the polymer network; and at least one attractive force that acts to shrink it. Primarily four fundamental forces drive volumetric changes in aqueous gels: ionic, hydrophobic, hydrogen bonding and van der Waals bonding interactions. Each of these interactions may be independently responsible for a volume transition in gels. Each of these fundamental forces is most strongly affected by a particular trigger. Changes in solvent concentration most strongly affect the van der Waals interaction; changes in temperature most strongly affect hydrophobic interactions and hydrogen bonding; and changes in pH and ion concentration most strongly affect ionic interactions.

A gel whose volume change is governed by ionic interactions includes components that are weakly acidic and weakly basic, such as poly(methylmethacrylate)/dimethylaminoethyl methacrylate and cellulose ethers such as cross-linked hydroxypropylcellulose. Gels of this type are sensitive to pH.

Gels whose volume change is governed by hydrogen bonding will collapse with a decrease in temperature and are exemplified by interpenetrating polymers that comprise water-swollen acrylamide as one polymer and acrylic acid as the other polymer.

Gels whose volume change is governed by hydrophobic interactions will collapse when challenged with an increase in temperature and are exemplified by poly(N-isopropylacrylamide).

Gels whose volume change is governed by van der Waals interactions will behave similarly to those governed by hydrophobic interactions.

Gels can be formulated so that the volume change is governed by more than one fundamental force. For instance, gels consisting of copolymers of positively and negatively charged groups meet this requirement. In these gels, for example, polymer segments interact with each other through ionic interactions and hydrogen bonding. The combination of these forces results in the existence of several pH-driven volume-phase changes.

The volume of gels can be easily controlled by influencing various components of a property called the osmotic pressure. According to classical mean field theory, these three osmotic pressures interact in the following way:

$$\pi = \pi_{rubber} + \pi_{affinity} + \pi_{ion}$$

The rubber elasticity, $\pi_{rubber}$, which originates from the configurational entropy of the polymer network, provides a restoring pressure back to the reference polymer network density. When a polymer network is expanded, a negative pressure is created in the network, and the network shrinks back. On the other hand, when the network is contracted, the pressure acts to expand the network to the original reference state. The polymer—polymer and polymer-solvent interactions give rise to another osmotic pressure, $\pi_{affinity}$. In a poor solvent, the polymer network tends to shrink, whereas in a good solvent a gel tends to swell. The last factor is the osmotic pressure due to ionization of the polymer network, $\pi_{ion}$. The counter-ions within the gel create a gas-type pressure to expand the gel in proportion to the density of counter-ions as well as the absolute temperature.

The sum of the three components results in a total osmotic pressure, which the gel strives to keep at zero. If this pressure is negative the gel will shrink, while if positive will cause the gel to expand. Contraction of the gel will expel water and expansion will absorb water. This process is repeatable and reversible and volume changes of up to 1000% or more can occur.

Gel volume is equilibrated in a condition at which these three osmotic pressures balance at $\pi_{rubber}=0$. There is a special condition at which the competing pressures become equal to each other, at which point the volume change occurs. When the ionization pressure is large, as in the case of extensively ionized gels, the volume change is physically dramatic and discontinuous. With increased ionization, the volume change becomes large. There exists a minimum critical concentration of ionic component within a gel sorbent for each solvent system employed in order to achieve reversible discontinuous volume change of the gel sorbent. This minimum ionic concentration can be determined for each polymer network and solvent system. The considerations discussed above summarize the qualitative nature of volumetric changes.

A critical factor is the time it takes for a gel to swell or shrink. In some applications a phase transition time of days may be adequate, but for use with the present invention, the hydrogel must undergo a change in volume in a matter of minutes or seconds. The time taken for a gel to complete its volume-phase change is governed by a phenomenon called the collective diffusion property of the polymer network. The network must expand or diffuse into the water and in so doing absorb water molecules. Near the surface of the gel this process happens quickly, but the diffusing molecules must travel a greater distance as the depth of the network increases. In addition, the gel molecules experience difficulty or "friction" in moving through regions of the network where polymer chains have not yet expanded. As a result, the diffusion process speed is proportional to the square of the characteristic size of a gel pareticle, which typically is the diameter for a spherical or cylindrical gel particle and the thickness for a slab. As the gel expands and the friction is reduced, by many orders of magnitude, the diffusion process speeds up and results in the abrupt phase change observed at the critical point of volume change. The speed of diffusion is greatly increased when gels are used in particle form.

Gels are selected for use based on their VPTCT. Gels may have a VPTCT that is too high for any practical use. Preferred gels for use with the present invention include poly(N-isopropylacrylamide) ("NIPA") gels. A NIPA gel swollen with an aqueous solution undergoes reversible changes around its VPTCT. NIPA polymer chains show an expanded conformation in aqueous fluids having a temperature below the VPTCT accompanied by swelling provided fluid is available because of strong hydration and change to the contracted conformation at a temperature above the VPTCT accompanied by sudden dehydration or expulsion of the fluid in the gel network. The volume phase transition appears to involve a reversible formation and cleavage of hydrogen bonds between hydrophilic groups and surrounding water molecules with a change in temperature.

Copolymerization of NIPA with water-insoluble monomers typically lowers the VPTCT, and copolymerization with ionizable groups increases the VPTCT of the resulting copolymers and enables one to vary the temperature of discontinuous volume phase transitions in a gel. A rule of thumb is that introduction of a more hydrophobic constituent generally lowers the VPTCT of the resulting copolymer, and introduction of a less hydrophobic constituent tends to increase the VPTCT of the resulting copolymer.

Copolymerization of NIPA with divinyl monomers leads to formation of cross-linked networks, which form gels when swelled in an aqueous fluid. Copolymers of NIPA with cross-linking agents such as, for example, N,N'-methylenebis(acrylamide) (BIS), ethylene glycol dimethacrylate, N-hydroxymethylacrylamide, etc. and the like are useful in the present invention. Swelling of the gels is greatly affected by the density of cross-links, i.e., by the molar ratio between the cross-linking agents and the comonomers. The higher the cross-link density, the lower the volume of equilibrium swelling of the gels at a fixed temperature.

For example, gels useful for the present invention can be synthesized by free-radical copolymerization of NIPA as a main backbone constituent, N-tert-butylacrylamide (NTBA) as a hydrophobic monomer, sodium acrylate as an ionizable monomer, N,N'-methylenebisacrylamide (BIS) as a cross-linker, 2,2'-azobisisobutyronitrile (AIBN) as a free-radical initiator, and using dimethylsulfoxide (DMSO) as a common solvent. Those skilled in the art can prepare many other gels useful in the present invention.

In accord with the present invention, the gels are made into particles and embedded into a flow control layer, preferably a hydrophilic foam having an open cell structure. The foam is efficient in containing the gel. The foam containing embedded gel particles is formed into a layer of desired thickness for use in the layered material manufacturing process. The foam layer is laminated to a protective layer such as a neoprene layer. Optionally, additional layers can be added to the laminate for cosmetic, aesthetic, or other purposes. The laminate material is compatible with existing methods of cutting and stitching used in the wet suit industry. Alternatively, the foam layer can be formed directly on the protective layer.

Any foam material can be used in the web materials of the present invention. For certain applications such as for a wet suit, a resilient foam is preferred. The gel particles in the foam are present typically in an amount from about 5% to about 80%, preferably about 30% to about 60%, by weight based on the total dry weight of the foam layer. The amount of gel in the foam depends upon the application and upon the type of foam that is used.

The foam layer containing the gel particles forms the reactive component of the laminate web material that is responsible for the regulation of fluid flow and, thus, temperature of a surface in contact with the web material. The foam containing gel particles can also be provided in a tubular member.

In one application, the web material of the present invention is used to make wet suits for divers. In this application, major factors influencing the thermal regulation ability of the suit are the thickness of the foam substrate layer, the amount of gel particles in the foam, the permeability of the foam substrate, the transition temperature ("VPTCT") of the hydrogel, and the response time of the hydrogel. The gel is designed and formulated to have a phase transition at an optimal temperature ("VPTCT") for skin temperature regulation, the gel contracting above this temperature and swelling below it. This sets up a passive, closed loop control system that regulates the flow of water through the suit in submerged operations by regulating the permeability of the foam substrate in response to environment temperature, through the volume change action of the gel.

With reference to FIG. 1, the general construction of a preferred embodiment of the present invention is shown, including the outer cosmetic layer 18, the neoprene layer 16, the gel-containing foam substrate layer 14, and the inner cosmetic or slick surface layer 12. The operation of this embodiment and the process of flow control will now be described.

The web material forming the wet suit works by reactively controlling the permeability of the inner layer 12 of the wet suit fabric to regulate the flow of water in the foam layer of the suit. Water pumping through the foam layer of the suit is responsible for the majority of heat loss experienced by the diver. If pumping is limited or stopped, heat loss is substantially reduced. The thickness of the suit material becomes of secondary importance to the function of the gel-containing foam layer in providing thermal insulation. Therefore, by controlling or eliminating pumping, it is possible to design suits which use a thinner layer of neoprene, greatly enhancing comfort and ease of movement. On the other hand, simply trying to eliminate pumping altogether could conceivably result in too much thermal protection, particularly in warmer waters. It is desirable to control the thermal protection offered in reaction to prevailing conditions in order to provide improved safety as well as flexibility of use in varying conditions.

The foam substrate's permeability is controlled through the volume phase change of the gel in response to temperature. As cold water enters the foam substrate the gel expands and the permeability of the foam layer decreases. On the other hand, when warmer water enters the foam substrate, the gel contracts and permeability of the foam layer increases. In cold water conditions, this has two consequences: the first is that flow is restricted in response to cooling, and the second is that through filling the voids in the foam upon cooling, the foam substrate becomes stiffer and tightens the fit of the suit, improving the thermal protection offered by the suit. The opposite is true upon heating.

The diver experiences the following: upon immersion cold water flows into the suit and the foam substrate is flooded, cooling the gel. Consequently, the gel absorbs the water, thereby expanding to limit flow and tighten the fit of the suit. Because the water is trapped in the gel, convective heat loss is effectively eliminated, minimizing the heat lost through pumping. The neoprene is a good insulator and, over time, in the absence of convection the diver will begin to heat up. As the diver warms and the gel in the foam substrate is heated past its transition temperature (i.e. the gel volume phase transition critical temperature), it will begin to shrink, thereby increasing permeability of the foam substrate. This results in increased heat loss through convection, cooling the diver. Given that the gel is designed for volume phase transition at a specific temperature ("VPTCT"), the process of heating and cooling will cause the average temperature of the foam substrate to oscillate around the transition temperature of the gel, maintaining the diver's skin temperature at a comfortable predetermined level.

When the diver exits the water, total heat loss is dramatically reduced through the lower heat capacity of the air and the absence of forced convection. As a result the gel in the foam substrate heats very quickly, causing it to shrink and shed its water. As water is released by the suit, the fit will also be relaxed.

In an alternative embodiment of the present invention, the neoprene layer 16 contains closed cells with air molecules contained therein. Gel particles are dispersed in the flow control layer 14 in a manner previously described, the hydrogel particles being either embedded in a foam matrix or otherwise contained in the flow control layer. A gap between the wet suit and the body (e.g. skin 11) of the wearer ensures a loose fit for land operations and allows a thin layer of water to be trapped close to the skin. The gel expands in response to cold water having a temperature below the VPTCT, absorbing water and thus restricting permeability of the flow control layer. Warm temperatures cause the gel to expel water, thereby increasing permeability of the flow control layer. In this alternate embodiment, the interface between the neoprene layer 16 and the flow control layer 14 contains one or more permeable seams which facilitate water exchange through the layers. The air in the closed cell within the neoprene layer 16 further enhance the ability of the suit to breathe and thus respond to environmental conditions to maintain the temperature of the wearer at approximately the VPTCT.

In a further variation of the above described alternate embodiment, the flow control layer 12 can contain a mixture of gel particles and particles containing closed cell air. The addition of air particles within the flow control layer results in a significantly reduced conductivity. As the gel swells, the thickness of the gel/air mixture increases, decreasing the effective conductivity of the layer. Otherwise, this embodiment functions in a manner similar to the aforementioned alternative embodiment.

Mathematical Modeling Of Wet Suit Behavior

The characteristics of suit performance can be modeled mathematically. Due to the fact that it is impossible to model the behavior of an actual suit on the body because of a number of variables in the system that either cannot be measured or defined, this model was created to highlight performance trends of the web material for equilibrium conditions.

The analysis afforded by this model shows skin temperature to have a strong dependence on metabolic rate, heat exchange through pumping, and environment temperature. However, the results confirm that the gel layer thickness and, therefore, conductance has a negligible effect on skin temperature.

The gel behavior was modeled simply by calculating the average gel temperature and determining its swell ratio from experimental data. This ratio was used to calculate the amount of obstruction the gel would present to fluid flow due to pumping. The heat lost to pumping is related linearly to the degree of obstruction and was limited to be between 0% and 60% of the total heat loss, the limits being determined based on reports of experimental results found in scientific literature.

This model was evolved to reflect the operation of the foam layer and therefore to include the changes in permeability of the foam. Additional changes included preparing the model to accept and easily scale or modify the gel phase transition curves to reflect the effect of changes in salinity and pressure.

Figure 4:
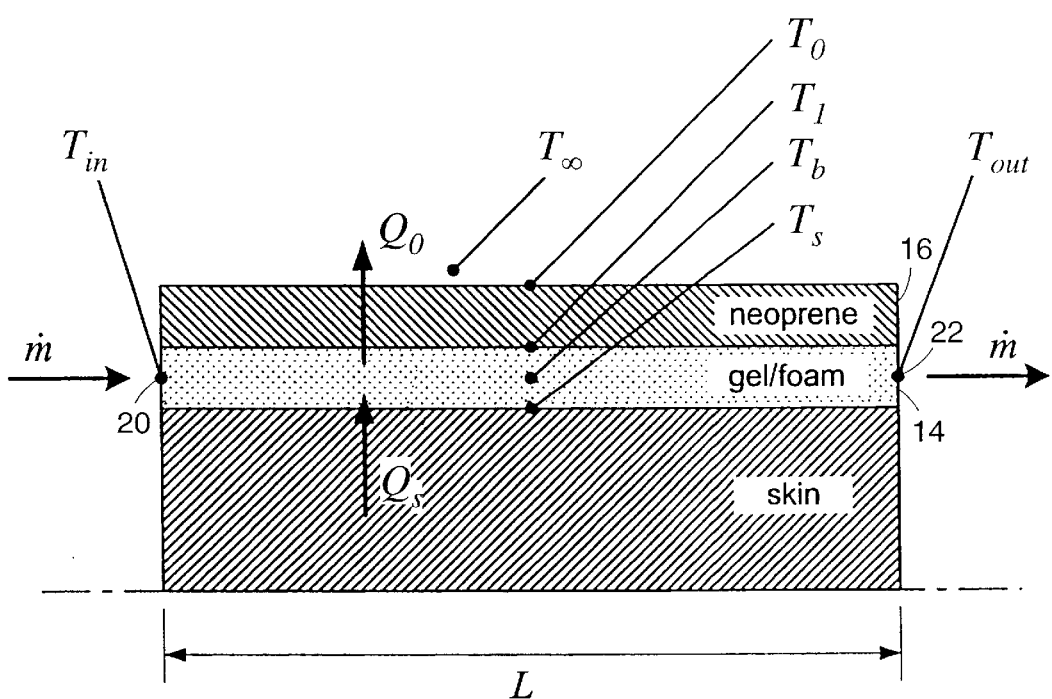
FIG. 4 is a schematic depiction of the layout of a theoretical model based on the material illustrated in FIG. 1.

FIG. 4 shows a schematic for the thermal analysis. Water flows into the suit at an inlet point 20 and out at an outlet point 22, described by the mass flow rate $\dot{m}$. Some time after initial exposure to cold water, the suit layers will be influenced by the cold water and begin to cool. As the foam substrate cools to a temperature below the gel transition temperature, the gel swells, causing the permeability of the foam substrate to decrease. The decrease in permeability has several effects on the overall system. Most important is decreased heat loss through a reduced rate of pumping, thereby keeping the body warm in the cold water. This model captures the aforementioned processes. The overall objective of the analysis is to determine the skin temperature $T_s$ over a wide range of environment temperatures and skin heat fluxes.

The methodology is best described by first considering the fundamental equations separately. Consider a control volume drawn around the foam annulus, shown in the cross-sectional view of FIG. 4. The energy equation applied to this control volume is written as:

$$Q_s - Q_o = \dot{m}c(T_{out} - T_{in}) \quad (1)$$

The terms on the left-hand side of Equation 1 represent the heat transfer from the skin and through the layers, respectively. The term on the right-hand side of Equation 1 represents the rate of energy loss caused by exposure suit pumping, where c represents the specific heat of water.

For a first approximation, the inlet temperature $T_{in}$ can be set equal to the environment temperature $T_\infty$, $$T_{in} = T_\infty \quad (2)$$

The convection heat transfer from the skin 11 to the waterlogged foam substrate 14 is written as:

$$Q_s = h_i A_i (T_s - T_b) \quad (3)$$

where $h_i$ is the inner film coefficient, $A_i$ is the heat transfer area for the inner film, $T_s$ is the temperature of the skin, and $T_b$ is the bulk temperature of the water.

The convection heat transfer from the waterlogged foam substrate 14 to the inner neoprene surface is written as:

$$Q_o = h_o A_o (T_b - T_1) \quad (4)$$

where $h_o$ is the outer film coefficient, $A_o$ is the heat transfer area for the outer film, $T_b$ is the bulk temperature of the water, and $T_1$ is the temperature of the inner neoprene layer.

The conduction heat transfer through the neoprene layer 16 is written as:

$$Q_o = C_n (T_1 - T_o) \quad (5)$$

where $C_n$ is the conductance of the neoprene layer, $T_1$ is the temperature of the inner neoprene layer, and $T_o$ is the temperature of the outer neoprene layer.

The convection from the outer neoprene surface to the environment is given by:

$$Q_o = h_{ext} A_{ext} (T_o - T_\infty) \quad (6)$$

where $h_{ext}$ is the external film coefficient, $A_{ext}$ is the heat transfer area for the external film, $T_o$ is the temperature of the outer neoprene layer, and $T_\infty$ is the environment temperature.

The bulk temperature of the water (or the mean gel temperature) can be written in terms of the inlet and outlet temperatures:

$$T_b = \frac{T_{in} + T_{out}}{2} \qquad (7)$$

where $T_{in}$, is the temperature of the water at the inlet and $T_{out}$ is the water temperature at the outlet (see FIG. 4).

Equation 7 is worth mentioning in some detail. In reality, all of the temperatures increase linearly in the axial direction, due to the constant surface heat flux boundary condition. The bulk temperature for example, ranges from $T_{in}$ to $T_{out}$. However, for small length scales the axial temperature gradient may be neglected, and a single temperature averaged over the length L can be used to describe each surface. This averaging scheme is implied in each of the above equations. For example, $T_1$ appearing in Equations 4 and 5 is the average value of the inner neoprene surface temperature along the length L.

Assuming that local thermal equilibrium exists, the bulk water temperature $T_b$ is equal to the mean gel temperature. Therefore a functional expression may be written which relates the gel volume to the bulk temperature $T_b$. This expression is based on the gel transition curve for a particular gel. That is, $$V = f(T_b) \qquad (8)$$

The porosity of the foam substrate may be written as:

$$\varepsilon = \frac{V_{tot} - V_{foam} - V}{V_{tot}} \qquad (9)$$

where $V_{tot}$ is the total volume of the gel/foam layer, $V_{foam}$ is the foam volume, and V is the gel volume.

Notice that the maximum porosity of the foam corresponds to the gel being in the fully collapsed (contracted) condition. A relationship between the flow rate and permeability must now be considered. For laminar flow through porous media, Darcy's law may be applied, and is written as:

$$\dot{m} = \frac{\rho A_c K}{\mu L} \Delta P \qquad (10)$$

where the left side of the equation represents the mass flow rate of water, $\rho$ is the mass density of water, $A_c$ is the cross-sectional area of the gel/foam layer, K is the permeability of the gel/foam layer, $\mu$ is the dynamic viscosity of water, L is the length of the suit, and $\Delta P$ is the pressure drop across the suit length.

This expression relates the flow rate, permeability, and pressure drop across the porous media length L. Finally, the permeability is related to the porosity using Ergun's empirical expression:

$$K = \frac{\varepsilon^3 D^2}{150(1-\varepsilon)^2} \qquad (11)$$

where D is the average length of the foam particles.

Figure 5A:
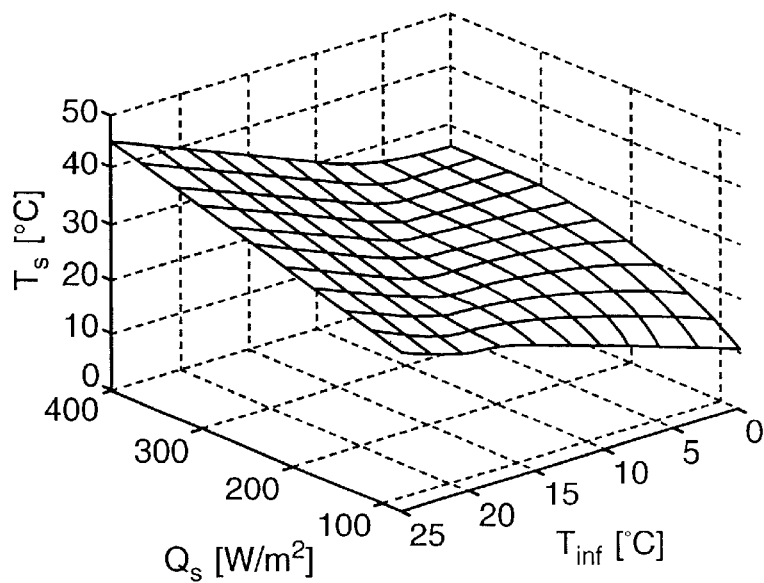
FIGS. 5A & 5B are graphs of the predicted performance trends for controlling skin temperature of a diver using a wet suit made with a material in accord with the present invention having a 4 mm thick foam substrate layer containing gel particles.
Figure 5B:
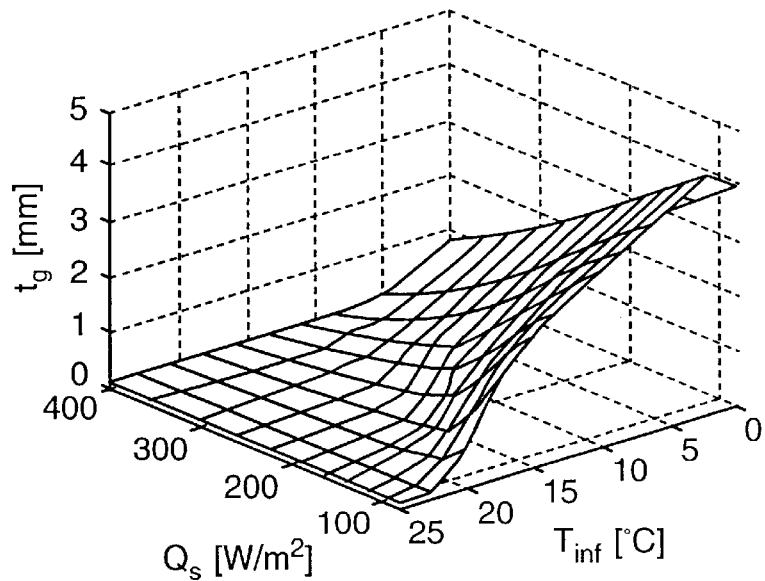

There are now eleven unknowns and eleven equations represented in vector x and two independent variables represented in vector u, $x = [Q_o \ \dot{m} \ T_{in} \ T_{out} \ T_s \ T_b \ T_l \ T_o \ V \ \varepsilon \ K]$ $u = [T_\infty \ Q_s]$ Solving the model through the use of a non-linear iterative solver generates a set of 3-dimensional working surfaces, which highlight the trends in the function of the suit. The predicted skin temperature and gel thickness performance trends are shown in FIGS. 5A and 5B.

Figure 6:
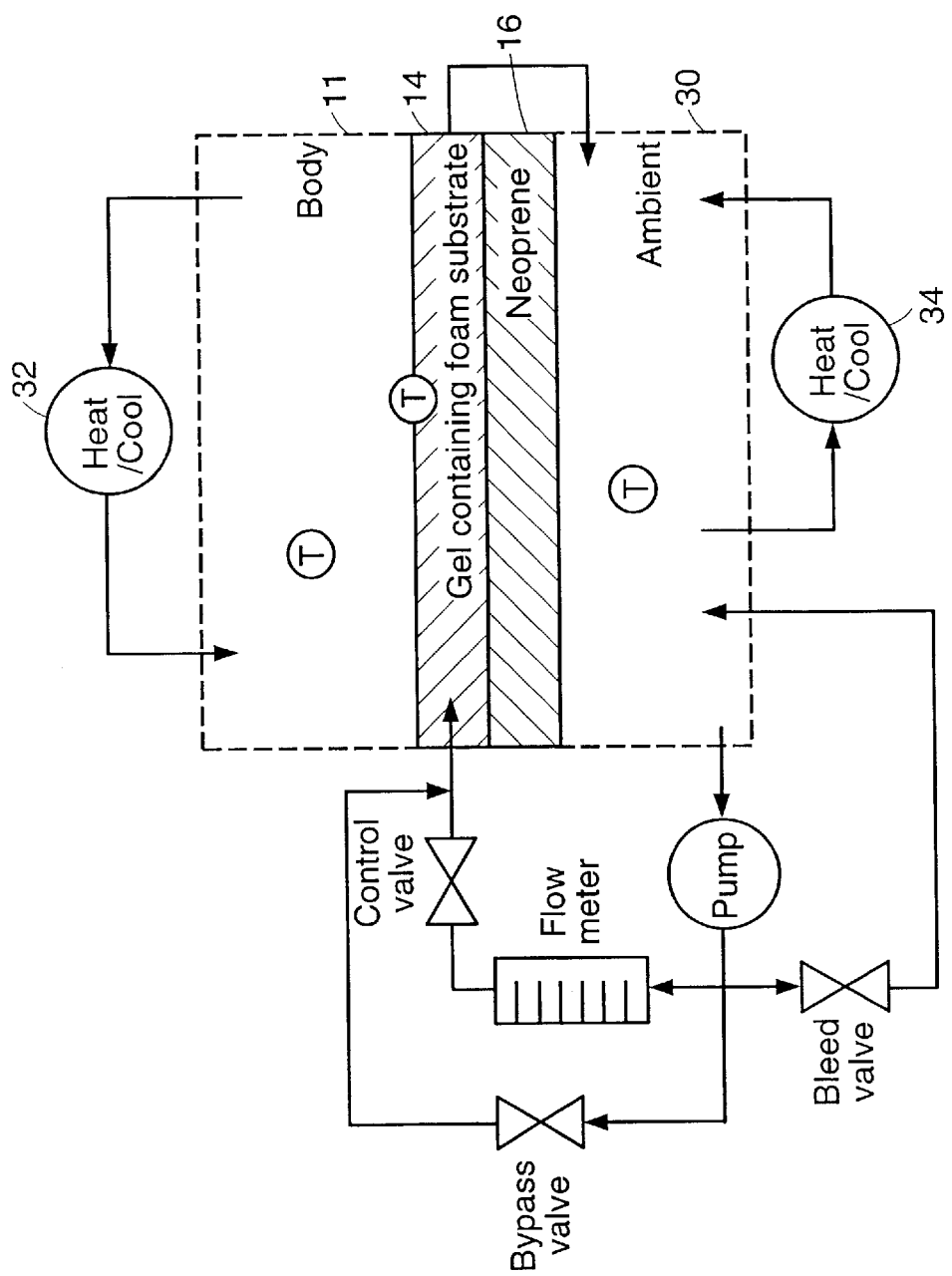
FIG. 6 is a schematic view of the test equipment used to test the fabric of the present invention.

Laboratory tests were done to verify the trends predicted by the mathematics. FIG. 6 depicts a test schematic used to verify the modeled behavior. The test setup has two separate control volumes. One represents the diver's body 11 and the other the environment 30 and space under the suit. In the body volume, water was circulated continuously and controlled, to represent the temperature of the human body, using a small laboratory heating/refrigerating bath 32. Temperature control of the environment volume was done by using a large heating/refrigerating bath 34 which regulated the temperature in a range between 1° C. and 25° C.

Figure 7A:
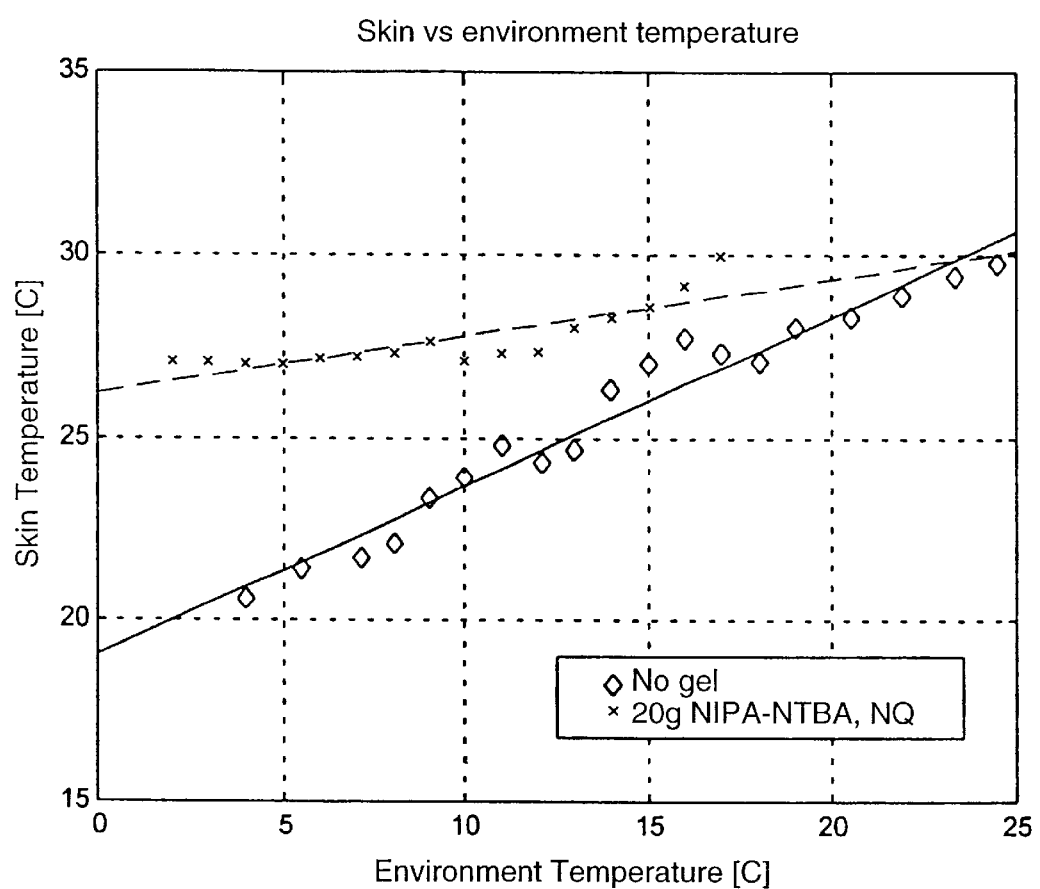
FIGS. 7A & 7B are graphs illustrating the relationship (a) between skin temperature and environment temperature and (b) between fluid flow in the material and environment temperature based on data after a change in temperature of the environment from about 30° C. to about 5° C. for material in accord with the present invention compared to material without the gel particles.
Figure 7B:
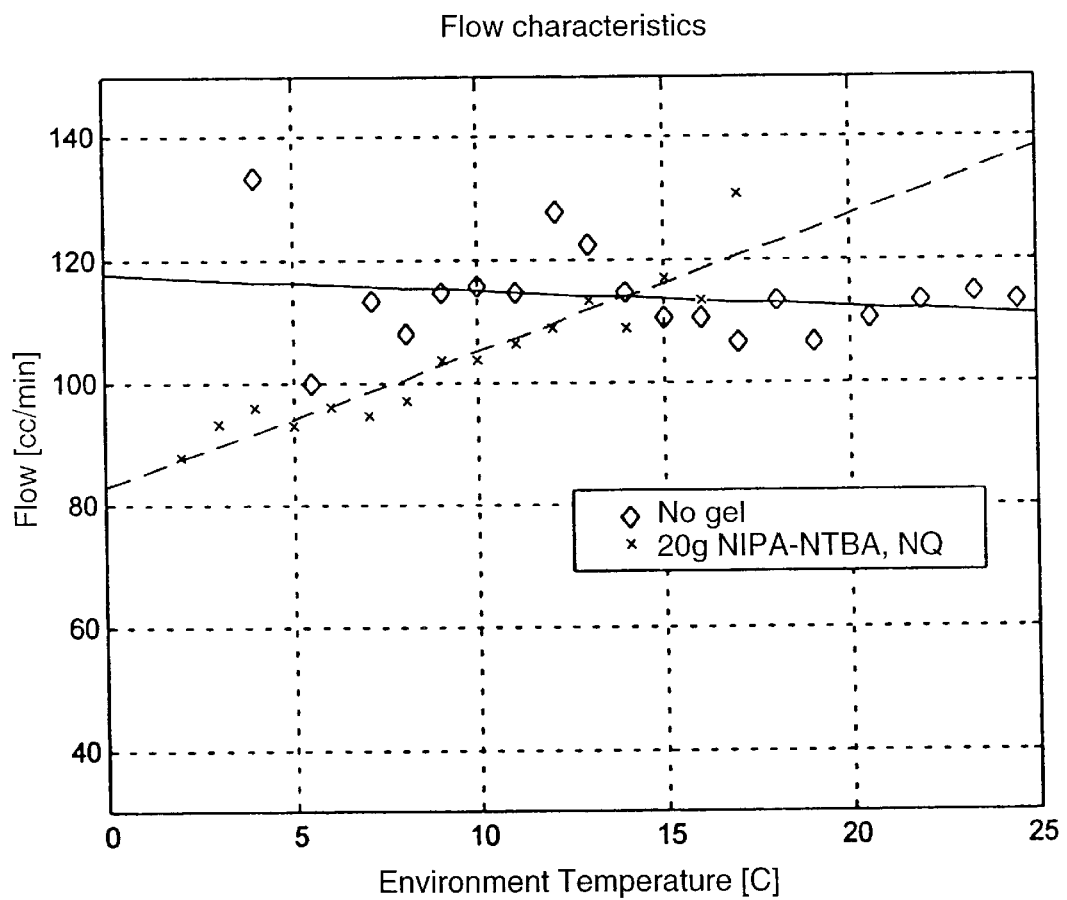

Steady state tests were conducted at a constant body temperature of 36.5° C. for environment temperatures ranging from approximately 2° C. to 20° C. Data was taken and plotted comparatively, showing the resultant skin temperature and the volume of flow under the suit. A response experiment was also done on the fabric for two extreme cases of exposure. During these tests flow rates were maintained constant because response time depends on this. The results obtained are shown in FIGS. 7A and 7B and confirm the trends predicted by the model for a specific metabolic rate. It is also clear from FIGS. 7A and 7B that the fabric patch is able to regulate the amount of flow effectively, resulting in a regulation of skin temperature. To confirm the fact that the fabric was able to respond to changes in operating conditions, dynamic response experiments were also performed.

Figure 8A:
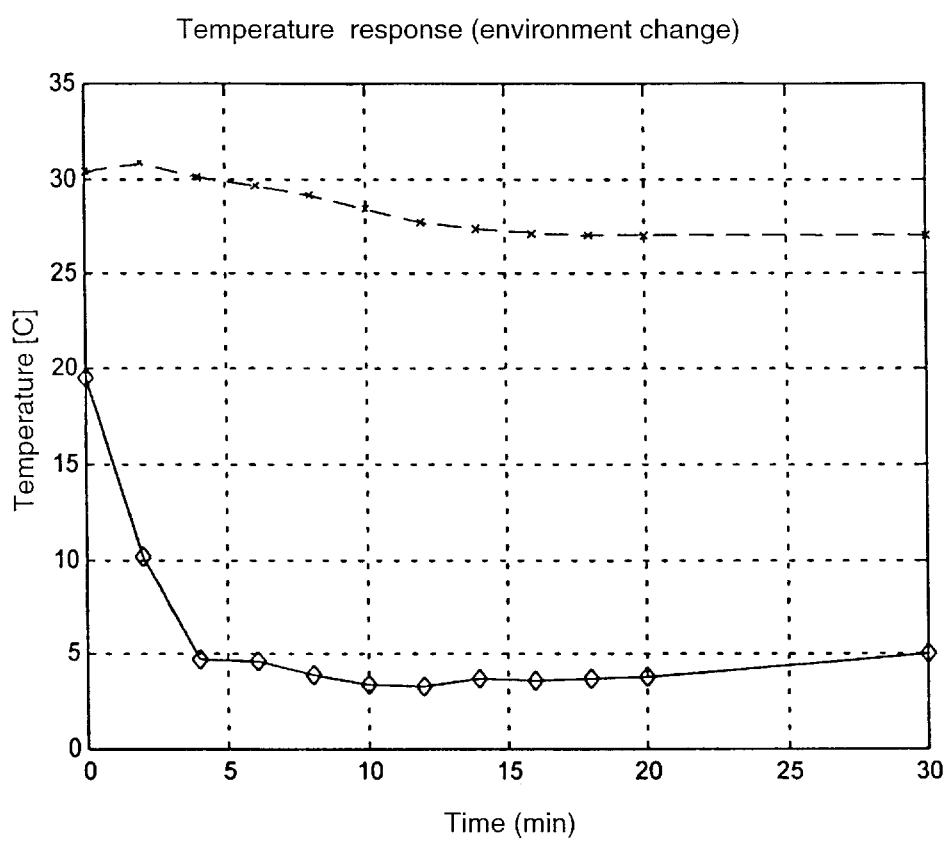
FIGS. 8A & 8B show data from dynamic response tests of a material in accord with the present invention.

The first response test was begun at steady state conditions in a relatively warm environment and skin temperature at approximately 30° C. (FIG. 8A). The environment temperature (◊) was suddenly cooled to below 5° C. and the skin temperature (x) response measured. The skin temperature took approximately 16 minutes to stabilize at 27° C., without ever going below this temperature. Incidentally, 27° C. was approximately the stable, regulated temperature maintained by the patch throughout most of the steady state test.

Figure 8B:
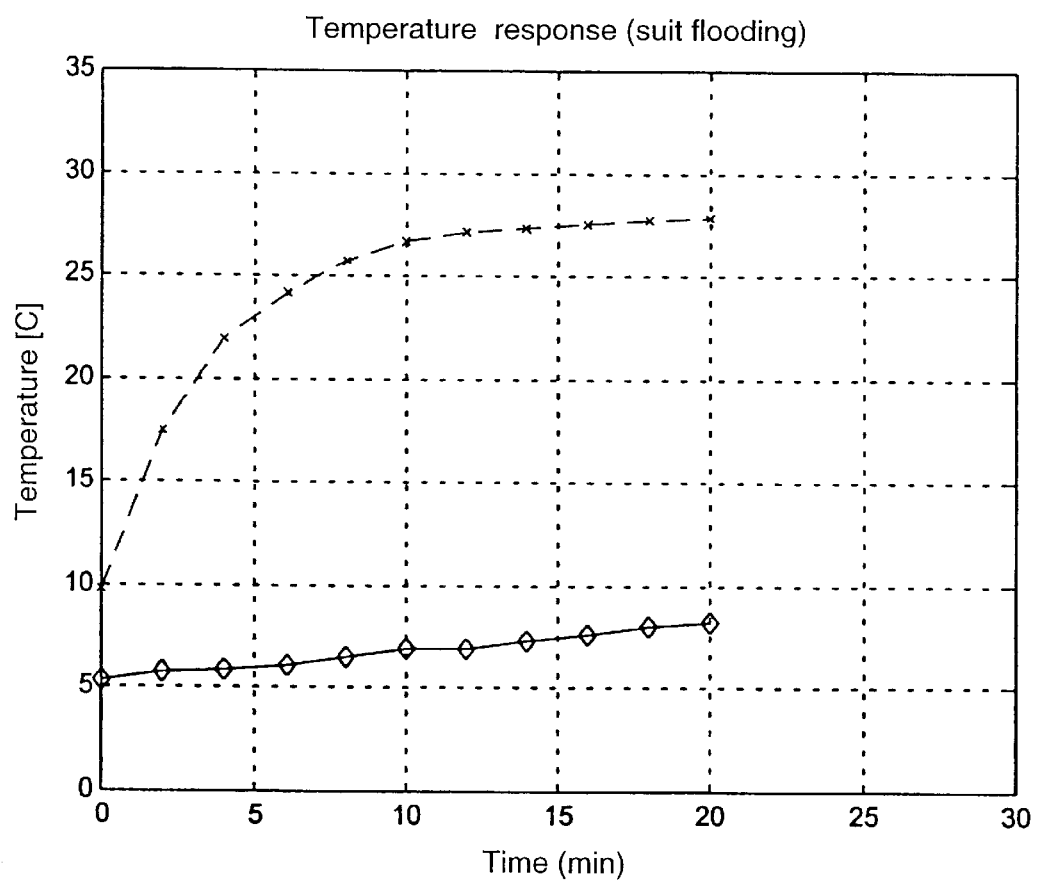

The second response test began at steady conditions with the skin temperature at approximately 27° C. and the environment temperature (◊) at about 5° C. (FIG. 8B). The patch was suddenly flooded with environment water (i.e., water was permitted to enter between the material and the skin) and the time taken for the skin temperature (x) to rise back to 27° C. was measured. This took about 12 minutes, with 20° C. achieved in the first 3 minutes.

These tests were conducted using a gel with a VPTCT of about 25° C.

A number of NIPA-based gels were synthesized and their equilibrium swelling properties were measured in aqueous solutions as a function of temperature. The gels were synthesized by free-radical copolymerization of NIPA as a main backbone constituent, N-tert-butylacrylamide (NTBA) as a hydrophobic monomer, sodium acrylate as an ionizable monomer, N, N'-methylenebisacrylamide (BIS) as a cross-linker, 2,2'-azobisisobutyronitrile (AIBN) as a free-radical initiator, and dimethylsulfoxide (DMSO) as a common solvent.

Inconsistencies in gel performance were observed due to a limited solubility of sodium acrylate in dimethylsulfoxide, which was used as a common solvent for all gel components (monomers). Such limited solubility appeared to cause some uncontrolled amounts of sodium acrylate to be left unpolymerized in the gel, which in turn led to inconsistencies in the gel performance.

To alleviate this problem, acrylic acid (a liquid that is fully miscible with DMSO) instead of sodium acrylate (solid with limited solubility in DMSO) was used. Thus, the gels were synthesized by free-radical copolymerization of NIPA as a main backbone constituent, N-tert-butylacrylamide (NTBA) as a hydrophobic monomer, N,N'-methylenebisacrylamide (BIS) as a cross-linker, 2,2'-azobisisobutyronitrile (AIBN) as a free-radical initiator, acrylic acid (for the ionizable monomer, e.g., when treated with sodium hydroxide), and dimethylsulfoxide (DMSO) as a common solvent. All components were dissolved in DMSO, the solution was deaerated by nitrogen bubbling, and the copolymerization was carried out at 60° C.

In order to neutralize the acrylic acid component and provide a sodium ion component, the resulting gels were allowed to swell in 0.1 M NaOH instead of deionized water. In all cases, the gels were transparent with no visible signs of inhomogeneity. The gels were then separated from the washouts, placed in fresh 0.1 M NaOH, collapsed by heating, and again separated by filtration.

Copolymerization of water-soluble monomers such as N-isopropylacrylamide (NIPA) and oil-soluble (but water-insoluble) monomers such as N-tert-butylacrylamide (NTBA) usually involves finding a common solvent where both monomers are fully soluble. Such common solvent should satisfy certain requirements, i.e. it should not affect the rate of polymerization or limit the molecular weight of the resulting copolymer. In addition, if polymerization is carried out in the bulk mode, the chosen solvent needs to be relatively non-volatile, in order for the reaction system to withstand elevated temperatures.

When prepared in bulk mode, the volume phase transition gels typically contain excess (>50% by weight) solvent (dimethylsufoxide) that is non-volatile and cannot be economically removed by simple evaporation. Yet, in order for the designed gels to undergo volume phase transition in response to temperature changes in an aqueous system, the organic solvent must be fully removed from the gel. The solvent can be removed by repeated washing of the gels with excess water, which produces large amounts of hazardous DMSO-water washouts. In addition, gels prepared in bulk tend to take the shape of the reaction vessel, and thus need to be pulverized by grinding after washing and drying.

Making the gels with a suspension/dispersion polymerization method, whereby monomers such as NIPA, NTBA, 2-acrylamido-2-methylpropanesulfonic acid (AMPS), as well as cross-linker (ethylene glycol dimethacrylate) and initiator (2,2'-azobisisobutyronitrile) are dissolved in a common volatile solvent, can significantly simplify the manufacturing process. The solution containing the monomers (discontinuous phase) is dispersed in an organic phase (continuous phase) immiscible with the solution in the form of small droplets, wherein the polymerization occurs, resulting in the volume phase transition gel already prepared in the form of small beads. The beads are filtered from the continuous phase and dried under vacuum. The kinetics of polymerization within each droplet are the same as in those in the bulk polymerization. The droplet-in continuous-phase two-phase system is maintained with vigorous agitation as well as stabilizing agent (surfactant), soluble in the continuous phase and compatible with the discontinuous phase, as is well known to those skilled in the art. Poly (vinylpyrrolidinone-co-1-hexadecene) is a satisfactory dispersion stabilizer for this process. Among solvents useful for producing discontinuous phase, 2-methyl-2-propanol is suitable because all components of the gel are soluble in this solvent.

Examples of preparing gels are described below. The present invention is not limited by these examples, which are presented only for illustrative purposes.

Example 1

(NIPA: 28 mmol; NTBA: 12 mmol; AIBN: 0.2 mmol; Sodium Acrylate: 2 mmol, and BIS: 0.2 mmol)

1. Dissolve 188 mg Na acrylate (MW 94), 3.168 g N-isopropylacrylamide (MW 113), 1.526 g N-tert-butylacrylamide (MW 127), 30.8 mg N,N'-methylenebisacrylamide (MW 154), and 32.8 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Example 2

(NIPA: 28 mmol; NTBA: 12 mmol; AIBN: 0.2 mmol; Sodium Acrylate: 2 mmol, and BIS: 2 mmol)

1. Dissolve 188 mg Na acrylate (MW 94), 3.168 g N-isopropylacrylamide (MW 113), 1.526 g N-tert-butylacrylamide (MW 127), 308 mg N,N'-methylenebisacrylamide (MW 154), and 32.8 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Example 3

(NIPA: 28 mmol; NTBA: 12 mmol; APS: 0.13 mmol; Acrylic acid: 2 mmol; and EGDMA: 2 mmol)

1. Blend 144 mg acrylic acid (MW 72), 3.168 g N-isopropylacrylamide (MW 113, mp 60–63° C.), 1.526 g N-tert-butylacrylamide (MW 127, mp 128–129°), 396 mg ethylene glycol dimethacrylate (MW 198), and 1 ml DI water. Place each chemical into a vial, seal the vial with a serum sleeve stopper, and shake the vial until the contents are homogeneous paste.

2. Deaerate the vial by nitrogen bubbling for 0.5 h using needles.

3. Inject 100 μL of freshly prepared 300-mg/ml aqueous solution of ammonium persulfate (MW 228.2).

4. Place the vial into a programmable water bath and keep at 60° C. for specified time.

5. Remove formed rubbery gel from the vial, cut into small pieces and place into DI water (1 L). Place the beaker into refrigerator and keep there for 3 days. Discard water. Insufficient swelling was observed, so that the gel was dried on air and was not tested for volume phase transitions.

Example 4

(NIPA: 28 mmol; NTBA: 12 mmol; AIBN: 0.2 mmol; Sodium Acrylate: 2 mmol; and BIS: 0.4 mmol)

1. Dissolve 188 mg Na acrylate (MW 94), 3.168 g N-isopropylacrylamide (MW 113), 1.526 g N-tert-butylacrylamide (MW 127), 61.6 mg N,N'-methylenebisacrylamide (MW 154), and 32.8 mg 2,2'-azobisisobutyronitrile (MW 164) in 10 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Example 5

(NIPA: 28 mmol; NTBA: 6 mmol; AIBN: 0.2 mmol; Sodium Acrylate: 2 mmol; and BIS: 0.4 mmol)

1. Dissolve 188 mg Na acrylate (MW 94), 3.168 g N-isopropylacrylamide (MW 113), 770 mg N-tert-butylacrylamide (MW 127), 61.6 mg N,N'-methylenebisacrylamide (MW 154), and 32.8 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Example 6

(NITPA: 28 mmol; NTBA: 18 mmol; AIBN: 0.2 mmol; Na acrylate: 2 mmol, and BIS: 4 mmol)

1. Dissolve 188 mg Na acrylate (MW 94), 3.168 g N-isopropylacrylamide (MW 113), 2.289 g N-tert-butylacrylamide (MW 127), 62 mg N,N'-methylenebisacrylamide (MW 154), and 32.8 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into excess water.

Example 7

(NIPA: 28 mmol; NTBA: 5.6 mmol; AIBN: 0.2 mmol; 2-acrylamido-2-methylpropanesulfonic acid: 2.8 mmol; and EGDMA: 2 mmol)

1. Dissolve 580 mg 2-acrylamido-2-methylpropanesulfonic acid (MW 207.25), 3.168 g N-isopropylacrylamide (MW 113), 356 mg N-tert-butylacrylamide (MW 127), 400 μL ethylene glycol dimethacrylate, and 32.8 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Example 8

(NIPA: 28 mmol; NTBA: 2.8 mmol; AIBN: 0.2 mmol; 2-acrylamido-2-methylpropanesulfonic acid: 2.8 mmol; and EGDMA: 2 mmol)

1. Dissolve 580 mg 2-acrylamido-2-methylpropanesulfonic acid (MW 207.25), 3.168 g N-isopropylacrylamide (MW 113), 356 mg N-tert-butylacrylamide (MW 127), 400 μL ethylene glycol dimethacrylate, and 32.8 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Example 9

(NIPA: 28 mmol; NTBA: 2.8 mmol; AIBN: 0.2 mmol; 2-acrylamido-2-methylpropanesulfonic acid: 2.8 mmol; and EGDMA: 2 mmol (effect of solvent))

1. Dissolve 580 mg 2-acrylamido-2-methylpropanesulfonic acid (MW 207.25), 3.168 g N-isopropylacrylamide (MW 113), 356 mg N-tert-butylacrylamide (MW 127), 400 µL ethylene glycol dimethacrylate, and 32.8 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and dry on air in a petri dish.

Example 10

(NIPA: 28 mmol; NTBA: 12 mmol; AIBN: 0.2 mmol; Sodium Acrylate: 2 mmol; and BIS: 0.4 mmol (larger quantity (×8)))

1. Dissolve 3.008 g Na acrylate (MW 94), 50.688 g N-isopropylacrylamide (MW 113), 24.416 g N-tert-butylacrylamide (MW 127), 986 mg N,N'-methylenebisacrylamide (MW 154), and 528 mg 2,2'-azobisisobutyronitrile (MW 164) in 160 g dimethylsulfoxide. Place each chemical into a plastic bottle, stir the bottle until the contents are mostly dissolved and seal the bottle with a rubber glove.

2. Deaerate the vial by nitrogen bubbling for 0.5 h using needles.

3. Place the vial into a programmable water bath and keep at 60° C. for specified time.

4. Remove formed gel from the bottle, cut into small pieces and place into DI water (2×1 L). Place the beakers into refrigerator and keep there for 3 days. Discard water. Place gel into fresh portion of DI water and heat up until gel collapses. Discard water and place gel into fresh DI water (1 L) and keep there for 1 day in refrigerator. Dry the gel in the vacuum oven at 60° C. overnight.

Example 11

(NIPA: 28 mmol; NTBA: 12 mmol; AIBN: 0.2 mmol; Sodium Acrylate: 2 mmol; and BIS: 0.4 mmol)

1. Dissolve 376 mg Na acrylate (MW 94), 6.336 g N-isopropylacrylamide (MW 113), 3.052 g N-tert-butylacrylamide (MW 127), 123.2 mg N,N'-methylenebisacrylamide (MW 154), and 66 mg 2,2'-azobisisobutyronitrile (MW 164) in 20 g dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator.

Example 12

(NIPA: 28 mmol; NTBA: 12 mmol; AIBN: 0.2 mmol; Acrylic Acid: 2 mmol; and BIS: 0.4 mmol (×6))

1. Dissolve 870 µl acrylic acid (MW 94), 19.008 g N-isopropylacrylamide (MW 113), 9.156 g N-tert-butylacrylamide (MW 127), 370 mg N,N'-methylenebisacrylamide (MW 154), and 200 mg 2,2'-azobisisobutyronitrile (MW 164) in 120 ml dimethylsulfoxide. Place each chemical into a plastic bottle, stir the contents for dissolution, and seal the bottle with a rubber glove.

2. Deaerate the vial by nitrogen bubbling for 0.5 h using needles.

3. Place the vial into a programmable water bath and keep at 60° C. for specified time.

4. Remove formed gel from the bottle, cut into small pieces and place into 0.1M NaOH (1 L). Place the beaker into refrigerator and keep there for 2–3 days. Discard excess solution and wash the gel with water. Place gel into fresh portion of DI water and heat up until gel collapses. Discard released water and dry the gel at about 60° C. using vacuum.

Example 13

(NIPA: 28 mmol; NTBA: 12 mmol; AIBN: 0.2 mmol; Acrylic Acid: 2 mmol; and BIS: 0.4 mmol (×6))

1. Dissolve 870 µl acrylic acid (MW 94), 19.008 g N-isopropylacrylamide (MW 113), 9.156 g N-tert-butylacrylamide (MW 127), 370 mg N,N'-methylenebisacrylamide (MW 154), and 200 mg 2,2'-azobisisobutyronitrile (MW 164) in 120 ml dimethylsulfoxide. Place each chemical into a plastic bottle, stir the contents for dissolution, and seal the bottle with a rubber glove.

2. Deaerate the vial by nitrogen bubbling for 0.5 h using needles.

3. Place the vial into a programmable water bath and keep at 60° C. for specified time.

4. Remove formed gel from the bottle, cut into small pieces and place into 0.1M NaOH (1 L). Place the beaker into refrigerator and keep there for 2–3 days. Discard excess solution and wash the gel with water. Place gel into fresh portion of DI water and heat up until gel collapses. Discard released water and dry the gel at about 60° C. using vacuum.

Example 14

(NIPA: 28 mmol; NTBA: 12 mmol; AIBN: 0.2 mmol, Acrylic Acid: 2 mmol; and BIS: 0.4 mmol (×6))

1. Dissolve 870 µl acrylic acid (MW 94), 19.008 g N-isopropylacrylamide (MW 113), 9.156 g N-tert-butylacrylamide (MW 127), 370 mg N,N'-methylenebisacrylamide (MW 154), and 200 mg 2,2'-azobisisobutyronitrile (MW 164) in 120 ml dimethylsulfoxide. Place each chemical into a plastic bottle, stir the contents for dissolution, and seal the bottle with a rubber glove.

2. Deaerate the vial by nitrogen bubbling for 0.5 h using needles.

3. Place the vial into a programmable water bath and keep at 60° C. for specified time.

4. Remove formed gel from the bottle, cut into small pieces and place into 0.1M NaOH (1 L). Place the beaker into refrigerator and keep there for 2–3 days. Discard excess solution and wash the gel with water. Place gel into fresh portion of DI water and heat up until gel collapses. Discard released water and dry the gel at about 60° C. using vacuum.

Example 15

(NIPA: 28 mmol; NTBA: 12 mmol; AIBN: 0.2 mmol; Acrylic Acid: 2 mmol; and BIS: 0.4 mmol (×6))

1. Dissolve 870 µl acrylic acid (MW 94), 19.008 g N-isopropylacrylamide (MW 113), 9.156 g N-tertbutylacrylamide (MW 127), 370 mg N,N'-methylenebisacrylamide (MW 154), and 200 mg 2,2'-azobisisobutyronitrile (MW 164) in 120 ml dimethylsulfoxide. Place each chemical into a plastic bottle, stir the contents for dissolution, and seal the bottle with a rubber glove.

2. Deaerate the vial by nitrogen bubbling for 0.5 h using needles.

3. Place the vial into a programmable water bath and keep at 60° C. for specified time.

4. Remove formed gel from the bottle, cut into small pieces and place into 0.1M NaOH (1 L). Place the beaker into refrigerator and keep there for 2–3 days. Discard excess solution and wash the gel with water. Place gel into fresh portion of DI water and heat up until gel collapses. Discard released water and dry the gel at about 60° C. using vacuum.

Example 16

(NIPA: 28 mmol; NTBA: 3.7 mmol; AIBN: 0.2 mmol; 2-acrylamido-2-methylpropanesulfonic acid: 2.8 mmol; and EGDMA: 2 mmol)

1. Dissolve 580 mg 2-acrylamido-2-methylpropanesulfonic acid (MW 207.25), 3.168 g N-isopropylacrylamide (MW 113), 237 mg N-tert-butylacrylamide (MW 127), 400 µL ethylene glycol dimethacrylate, and 32.8 mg 2,2'-azobisisobutyronitrile (MW 164) in 20 ml dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Example 17

(NIPA: 28 mmol; NTBA: 8.4 mmol; AIBN: 0.2 mmol; 2-acrylamido-2-methylpropanesulfonic acid: 2.8 mmol; and EGDMA: 2 mmol)

1. Dissolve 580 mg 2-acrylamido-2-methylpropanesulfonic acid (MW 207.25), 3.168 g N-isopropylacrylamide (MW 113), 538 mg N-tert-butylacrylamide (MW 127), 400 µL ethylene glycol dimethacrylate, and 32.8 mg 2,2'-azobisisobutyronitrile (MW 164) in 20 ml dimethylsulfoxide. Place each chemical into a vial, seal the vial with a serum sleeve stopper, and shake the vial until the contents are dissolved.

2. Deaerate the vial by nitrogen bubbling for 0.5 h using needles.

3. Place the vial into a programmable water bath and keep at 60° C. for specified time.

4. Remove formed gel from the vial, cut into small pieces and place into DI water (1 L). Place the beaker into refrigerator and keep there for 3 days. Discard water. Place gel into fresh portion of DI water and heat up until gel collapses. Discard water and place gel into fresh DI water (1 L) and keep there for 1 day in refrigerator. Test the gel for the characteristics of volume phase transitions.

Compositions of representative gels along with their gel volume transition phase critical temperatures (VPTCT) are listed below in Table 1. The VPTCT was determined by the appearance of opacity at a fixed temperature.

As seen from Table 1, a slight adjustment of gel content results in a shift of the VPTCT toward the temperature of 18° C., which is desired for a wet suit application. In addition, the gels were completely homogeneous without visible undissolved precipitates upon polymerization in DMSO.

TABLE 1

Molar content based on polyNIPA and a weak polyelectrolyte

| No. | NIPA (mmol) | NTBA (mmol) | Acrylic Acid (mmol) | BIS (mmol) | AIBN (mmol) | LCST (° C.) |
|---|---|---|---|---|---|---|
| 12 | 168 | 72 | 12 | 2.3 | 1.2 | 23 ± 3 |
| 13 | 169 | 72 | 12 | 2.4 | 1.3 | 22 ± 3 |
| 14 | 169 | 73 | 12 | 2.4 | 1.2 | 21 ± 3 |
| 15 | 167 | 74 | 12 | 2.4 | 1.4 | 19 ± 3 |

Figure 3:
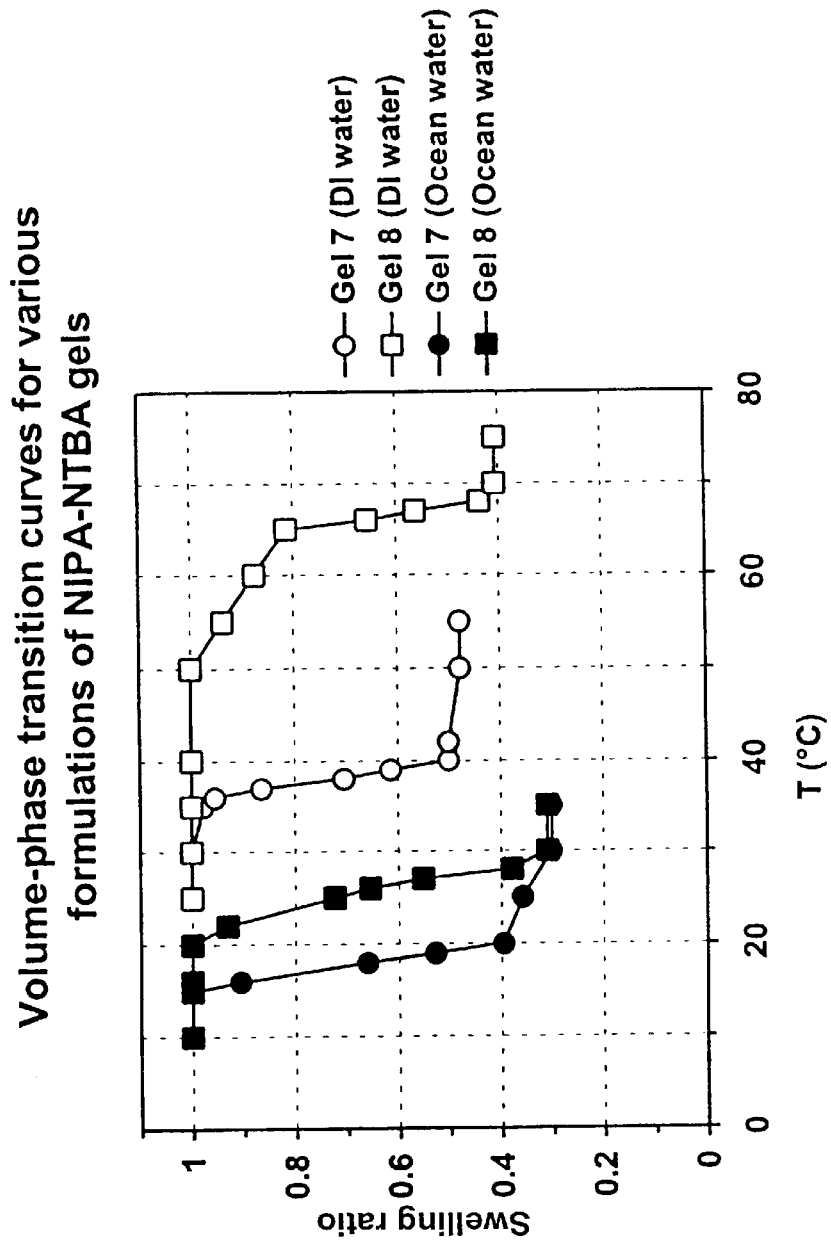
FIG. 3 is a typical volume-phase transition curve for NIPA-NTBA gels with sodium acrylate as the ionizing component.

FIG. 3 illustrates the volume-phase transition curves, as a function of temperature, for various formulations of NIPA-NTBA gel at various levels of ionization with sodium acrylate.

Given the fact that wet suits are used both in sweet water and ocean water, gels capable of volume phase transitions in ocean water were designed and tested. The presence of salt significantly affects the VPTCT of the charged temperature-sensitive gels. To solve this problem, a strategy of finding a proper ionizable gel component was adopted, which once found, was tested at different ratios of NIPA and the ionizable component.

Based on experiments, the weak electrolyte (acrylic acid or sodium acrylate) was replaced with a strong electrolyte, such as 2-acrylamido-2-methylpropanesulfonic acid (AMPS). AMPS is dissociated at any pH and conveys negative charge to the gel at any salt concentration. The presence of even a minute concentration of AMPS in the gel backbone significantly increases the VPTCT in the salt-free water, which can be shifted back down by the presence of salts. Based on this principle, the gel compositions were synthesized as shown in Table 2. Note that the gel numbers refer to the gels formulated in the specific Examples above.

TABLE 2

Molar content of gels based on polyNIPA and a strong electrolyte

| Gel No. | NIPA (mmol) | NTBA (mmol) | AMPS (mmol) | Ethylene glycol dimethacrylate (EGDMA) cross-linker (mmol) | AIBN (mmol) |
|---|---|---|---|---|---|
| 7 | 28 | 5.6 | 2.8 | 2 | 1.2 |
| 8 | 28 | 2.8 | 2.8 | 2 | 1.3 |
| 16 | 28 | 1.9 | 2.8 | 2 | 1.3 |
| 17 | 28 | 4.3 | 2.8 | 2 | 1.3 |

FIG. 3 shows that the presence of salts in the ocean water dramatically lowers the VPTCT. By varying the content of the hydrophobic component (NTBA) at fixed concentration of ionic component (AMPS) and amphiphilic component (NIPA), the VPTCT can be fine-tuned.

Although the invention has been described in detail including the preferred embodiments thereof, such description is for illustrative purposes only, and it is to be understood that changes and variations including improvements may be made by those skilled in the art without departing from the spirit or scope of the following claims.

What is claimed is:

1. A method for controlling the flow of a fluid in a material to maintain the fluid in thermal contact with the material approximately at a predetermined temperature, the method comprising the steps of:

providing a layer of the material in thermal contact with the fluid, the material containing particles of a gel embedded therein, the gel having a gel volume phase transition critical temperature (VPTCT) at about the predetermined temperature; and permitting the fluid to flow through the material to regulate a temperature of the fluid, wherein the gel particles in the material absorb the fluid and expand when the temperature of the fluid is below the gel volume phase transition critical temperature, and the gel particles contract and expel the fluid when the temperature of the fluid is above the gel volume phase transition critical temperature.

2. The method of claim 1, wherein the material is an open cell foam material.

3. The method of claim 1, wherein the layer of the material includes gel particles in an amount approximately 5% to 80% by weight of total dry weight of the material.

4. The method of claim 1, wherein the step of providing a layer of the material includes providing a wet suit to a diver.

5. The method of claim 4, wherein the gel is a hydrogel powder having a VPTCT in the range of about 18° C. to about 25° C.

6. The method of claim 4, wherein the layer of the material includes gel particles in an amount approximately 20% to 80% by weight of total dry weight of the material.

7. The method of claim 4, wherein the gel particles are formed from a poly(N-isopropylacrylamide) gel.

8. The method of claim 4, wherein the gel contains a hydrophobic monomer.

9. The method of claim 1, and further including a step of placing the layer of the material in contact with an object.

10. A method for controlling the flow of a fluid in an open cell foam substrate to regulate the temperature of the fluid approximately at a predetermined temperature, the method comprising the steps of;

providing a layer of the open cell foam substrate containing gel particles embedded therein, the gel particles having a gel volume phase transition critical temperature (VPTCT) at about the predetermined temperature; and permitting the fluid to flow through the open cell foam substrate to change the temperature of the fluid, wherein the gel particles in the open cell foam substrate absorb the fluid and expand in volume when the temperature of the fluid is below the gel volume phase transition critical temperature, and the gel particles expel the fluid and contract in volume when the temperature of the fluid is above the gel volume phase transition critical temperature.

11. The method of claim 9, and further including a step of placing the layer of the open cell foam substrate in contact with an object.

12. The method of claim 11, and further including a step of providing an inner layer between the layer of the open cell foam substrate and the object.

13. The method of claim 10, wherein the layer of the open cell foam substrate includes gel particles in an amount approximately 5% to 80% by weight of total dry weight of the open cell foam substrate.

14. The method of claim 10, wherein the layer of the open cell foam substrate includes gel particles in an amount approximately 20% to 80% by weight of total dry weight of the open cell foam substrate.

15. The method of claim 10, and further including a step of packaging the layer of the open cell foam substrate in a wet suit.

16. The method of claim 10, wherein the gel particles comprise a hydrogel powder having a VPTCT in the range of about 18° C. to about 25° C.

17. The method of claim 10, wherein the gel particles are formed from a poly(N-isopropylacrylamide) gel.

18. The method of claim 10, wherein the gel particles contain a hydrophobic monomer.

19. The method of claim 10, wherein the fluid comprises water.

20. A method for controlling the flow of a fluid in an open cell foam substrate to regulate the temperature of the fluid approximately at a predetermined temperature, the method comprising the steps of:

providing a layer of the open cell foam substrate containing gel particles embedded therein, the gel particles having a gel volume phase transition critical temperature (VPTCT) at about the predetermined temperature; and permitting the fluid to flow through the open cell foam substrate to change the temperature of the fluid, wherein the gel particles undergo a volume change response by which the gel particles absorb the fluid and expand in volume when the temperature of the fluid is below the gel volume phase transition critical temperature, and the gel particles expel the fluid and contract in volume when the temperature of the fluid is above the gel volume phase transition critical temperature.

21. The method of claim 20, and further including a step of placing the layer of the open cell foam substrate in contact with an object.

22. The method of claim 21, and further including a step of providing an inner layer between the layer of the open cell foam substrate and the object.

23. The method of claim 20, wherein the fluid comprises water.

* * * * *